(12) United States Patent
Chen et al.

(10) Patent No.: US 12,204,460 B2
(45) Date of Patent: Jan. 21, 2025

(54) SAFE EXECUTION OF PROGRAMS THAT MAKE OUT-OF-BOUNDS REFERENCES

(71) Applicant: International Business Machines Corporation, Armonk, NY (US)

(72) Inventors: Tong Chen, Yorktown Heights, NY (US); Alper Buyuktosunoglu, White Plains, NY (US); Richard H. Boivie, Monroe, CT (US); Gururaj Saileshwar, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 17 days.

(21) Appl. No.: 17/236,748

(22) Filed: Apr. 21, 2021

(65) Prior Publication Data

US 2022/0342830 A1    Oct. 27, 2022

(51) Int. Cl.
*G06F 12/14* (2006.01)

(52) U.S. Cl.
CPC ........ *G06F 12/1441* (2013.01); *G06F 12/145* (2013.01); *G06F 2212/1052* (2013.01)

(58) Field of Classification Search
CPC ............... G06F 12/1441; G06F 12/145; G06F 2212/1052
See application file for complete search history.

(56) References Cited

U.S. PATENT DOCUMENTS

| 6,578,094 B1 | 6/2003 | Moudgill | |
| 6,594,751 B1* | 7/2003 | Leivent | G06F 12/123 711/209 |
| 10,270,473 B2 | 4/2019 | Bahary et al. | |
| 10,509,734 B2 | 12/2019 | Durham et al. | |
| 2002/0031086 A1* | 3/2002 | Welin | H04L 47/24 370/428 |
| 2016/0283522 A1* | 9/2016 | Grueneberg | G06F 11/0766 |
| 2021/0110040 A1 | 4/2021 | Boivie et al. | |
| 2021/0200546 A1* | 7/2021 | Lemay | G06F 12/145 |

OTHER PUBLICATIONS

Chen et al., "Saturation Memory Access: Mitigating Memory Spatial Errors without Terminating Programs," Apr. 6, 2020 (Year: 2020).*
Brunink et al., "Boundless Memory Allocations for Memory Safety and High Availability," 2011 (Year: 2011).*

(Continued)

*Primary Examiner* — Michael Krofcheck
(74) *Attorney, Agent, or Firm* — Andre Adkins

(57) ABSTRACT

A method, system and apparatus for protecting a program from making out of bounds memory references, including determining whether an instruction makes out of bound references where the instruction that loads data from or stores data to a buffer refers to addresses that are outside the bounds of the buffer, and responsive to the determining that the instruction refers to addresses that are partially out of bounds, changing an execution of the load or the store including modifying the starting address specified in the instruction, a length of data specified in the instruction, or a value for an out of bounds reference to load or store data that is within the bounds of the buffer.

26 Claims, 28 Drawing Sheets

(56) References Cited

OTHER PUBLICATIONS

Sun et al. "S3Library: Automatically Eliminating C/C++ Buffer Overflow using Compatible Safer Libraries," Apr. 20, 2020 (Year: 2020).*
Reeves, Kitty; "CSE2421 Systems 1 Introduction to Low-Level Programming and Computer Organization" https://web.cse.ohio-state.edu/~reeves.92/CSE2421/SlidesSu13F2.pdf (Year: 2013).*
Github, "When and how should wasm producers help reduce the cost of bounds checking?" https://github.com/WebAssembly/design/issues/279 (Year: 2015).*
Notification of Transmittal of the International Search Report and the Written Opinion of the International Searching Authority, or the Declaration (PCT Form PCT/ISA/220), in PCT/EP2022/057546, dated May 30, 2022.
International Search Report (ISR) (PCT Form PCT/ISA/210), in PCT/EP2022/057546, dated May 30, 2022.
Written Opinion of the International Searching Authority (WOISA) (PCT Form PCT/ISA/237), in PCT/EP2022/057546, dated May 30, 2022.
Mel, et al. "The NIST Definition of Cloud Computing". Recommendations of the National Institute of Standards and Technology. Nov. 16, 2015.
Akritidis, P. et al.; "Baggy Bounds Checking: An Efficient and Backwards-Compatible Defense Against Out-of-Bounds Errors", Jan. 2009.
Gallagher, M. et al.; "Morpheus: A Vulnerability-Tolerant Secure Architecture Based on Ensembles of Moving Target Defenses With Churn", Apr. 2019.
ICA; "Managing Metadata to Protect the Integrity of Records", May 2016.
IPCOM000204795D; "Method and System for Optimal Identification of Checkers in a Microprocessor System", Mar. 10, 2011.
IPCOM000237293D; "Methodology and Procedure for Secure Granular Authorization and Audit Implementation in Distributed Enterprise Computing Environment", Jun. 11, 2014.
IPCOM000251426D; "Systems and Methods for Trust in SDN and NFV", Oct. 30, 2017.
Rinard, M. et al.; "A Dynamic Technique for Eliminating Buffer Overflow Vulnerabilities (An Other Memory Errors)", 2017.
University of Wisconsin; "Data Integrity and Protection", 2008.

* cited by examiner

|  | R2(value, index) | R3(value, index) |
|---|---|---|
| [1] R2 = load pointer R1 | (0x28, 2) | |
| [2] R3 = add R2, 0xa | (0x28, 2) | (0x32, 2) |
| [3] Store Rx, R3 | 0x32 will be stored into memory Pair of (0x32, 2) will be added to pointer_index table | |
| [4] R2 = load Rx | (0x32, 2) | |
| [5] R3 = sub R2, 0xa | (0x32, 2) | (0x28, 2) |
| [6] Rx = load R3 | | |

FIG. 22

SAFE EXECUTION OF PROGRAMS THAT MAKE OUT-OF-BOUNDS REFERENCES

BACKGROUND

The present invention relates to an embodiment of a method, apparatus, and system for safe execution of programs, and more particularly, but not by way of limitation, relates to a method, apparatus, and system for safe execution of programs that make out-of-bounds references.

Memory safety vulnerabilities (e.g., buffer overflow, race condition, page fault, null pointer, stack exhaustion, heap exhaustion/corruption, use after free, or double free, etc.) happen when software, accidentally or intentionally, accesses system memory in a way that exceeds its allocated size and memory addresses.

Programs such as C and C++, which have been used extensively in certain operating systems and other programs, can lead to a plurality of memory safety errors that attackers can exploit with dangerous and intrusive consequences, such as remote code execution or elevation of privilege flaws, etc. For example, by reading out-of-bounds memory, an attacker might be able to get secret values, such as memory addresses, which can bypass protection mechanisms.

Therefore, there is a need to have techniques that can reduce or eliminate memory safety vulnerabilities in an efficient manner.

SUMMARY

In view of the foregoing and other problems, disadvantages, and drawbacks of the aforementioned background art, an exemplary aspect of the disclosed invention provides a method, apparatus, and system for safe execution of programs that make out-of-bounds references.

An embodiment includes a method for protecting a program from making out of bounds memory references, including determining whether an instruction makes out of bound references where the instruction that loads data from or stores data to a buffer refers to addresses that are outside the bounds of the buffer, and responsive to the determining that the instruction refers to addresses that are partially out of bounds, changing an execution of the load or the store including modifying a starting address specified in the instruction, a length of data specified in the instruction, and a value for an out of bounds reference to load or store data that is within the bounds of the buffer.

An embodiment includes a system for protecting a program from making out of bounds memory references, including a memory storing computer instructions, and a processor configured to execute the computer instructions to determine whether an instruction makes out of bound references where the instruction that loads data from or stores data to a buffer refers to addresses that are outside the bounds of the buffer, and responsive to the determining that the instruction refers to addresses that are partially out of bounds, change an execution of the load or the store including modifying a starting address specified in the instruction, a length of data specified in the instruction, and a value for an out of bounds reference to load or store data that is within the bounds of the buffer. The embodiment can include unused bits located in a register to keep a separate copy of an index value.

Another embodiment includes a computer program product comprising a computer readable storage medium having program instructions embodied therewith, the program instructions readable and executable by a computer to cause the computer to perform a method for protecting a program from making out of bounds memory references, including determining whether an instruction makes out of bound references where the instruction that loads data from or stores data to a buffer refers to addresses that are outside the bounds of the buffer, responsive to the determining that the instruction refers to addresses that are partially out of bounds, changing an execution of the load or the store including modifying a starting address specified in the instruction, a length of data specified in the instruction, or a value for an out of bounds reference to load or store data that is within the bounds of the buffer. The embodiment can include unused bits located in a register to keep a separate copy of an index value.

Another embodiment includes a method of protecting a program from making out of bounds memory references, the method including establishing whether an instruction that loads data from or stores data to a buffer refers to addresses that are outside the bounds of the buffer, and responsive to determining that an instruction refers to addresses that are outside the bounds of a buffer, modifying the starting address specified in the instruction and/or the length of the data specified in the instruction so that the instruction only loads or stores data that is within the bounds of the buffer.

Another embodiment includes a system for system for securing applications which make out of bounds references, including a memory storing computer instructions, and a processor configured to execute the computer instructions to identify references which are out of bounds for a program, change an address, length or a value of partially out of bounds references for a load operation, and change the address or length for the partially out of bounds references for a store operation.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings.

FIG. 22 illustrates register values as example of protection in accordance with one or more embodiments described herein.

DETAILED DESCRIPTION

Figure 1:
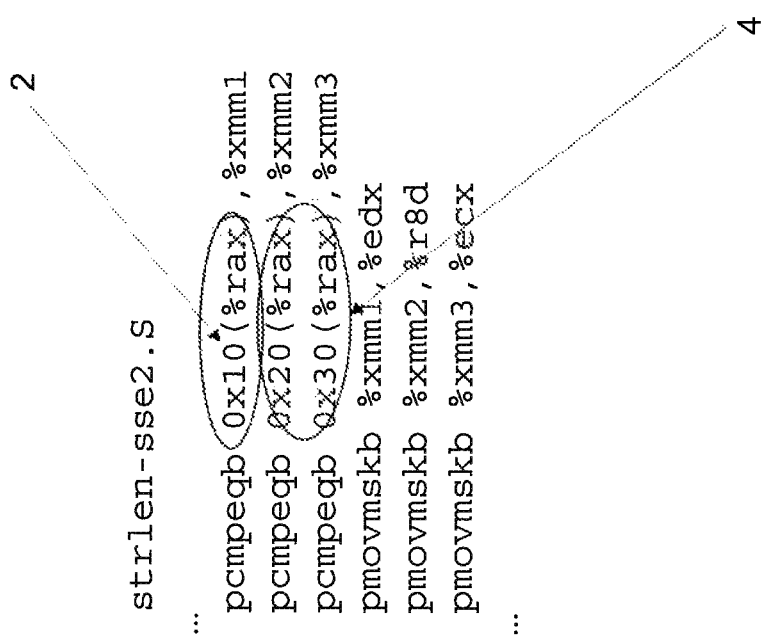
FIG. 1 illustrates an example of out-of-bounds references.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments will now be described with reference to the drawing figures, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims. Moreover, please note that any of the steps can be performed in different sequences or combined or at the same time. In addition, any of structures and embodiments shown can be modified or combined.

Memory references that are out of its bounds may cause serious security problems. Buffer Overflow vulnerabilities have been a problem for at least 30 years, e.g., Morris Internet Worm (1988). Buffer Overflow bugs have enabled many forms of attack including buffer-overflow based code injection, Return-Oriented Programming (ROP), "HeartBleed".

Existing methods abort program execution when an out-of-bounds reference is detected. The pros are that it is safe and good for debugging before release. However, the problems are that real applications may contain some unharmful out-of-bounds accesses. There can be software speculative loads for better performance, and minor bugs undetected before release.

Some work has been done to address buffer overflow attacks or the effects of buffer overflow attacks, e.g. "stack canaries", W XOR X memory pages, ASLR, "shadow stacks" & other approaches for protecting "control flow integrity").

Oracle Silicon Secured Memory (SSM) ("Colors" data in memory & prevents access by pointers that have "the wrong color". SSM has some limitations such as it only supports a very limited number of colors and the granularity of protected data is 64 bytes.

It is important to check whether each memory reference, load or store, is within its memory boundary. One existing solution is INTEL's Memory Protection Extensions (MPX) system. MPX introduced new instructions and hardware support for precise bounds check. In memory, bounds information (BI) for each buffer is stored/retrieved with pointer value as key. In the core, pointer and its BI are in registers and mapping is maintained with extra instructions added by the compiler. Original computation and bounds protection operation share the same hardware resource. There are other methods that attempt to remove or reduce the memory safety vulnerabilities.

However, all these other solutions have one major problem of needing a plurality of instructions to be added and also costly implementation. As a result, the number of instructions may increase four or more times and the execution time can be increased to two or more times even when the bounds checking is turned off.

INTEL MPX protects buffers from out-of-bounds reference with precise bounds information (BI). MPX stores BI of buffers in BI table through hashing of pointer values. The BI for a pointer is put into a general register when the pointer is loaded. The bookkeeping code is added to propagate BI in register to its consumer: load and store instructions. Bounds checking instructions are inserted before load and store.

The additional problems with MPX are that the load of BI may not be used and there is two-level memory access for BI. Other conventional methods have problems with leading to excessive load requests for BI entry, and BI is loaded and used in the same instruction, and so latency is not hidden.

There is need to detect when references to array elements including pointer references to array elements (e.g. x[i], *p++, p->foo) are out of bounds).

There is a need to be able to do this without re-writing existing programs and without significant space or time overhead.

There is a need to have a mechanism that allows a program that makes out-of-bounds references to execute safely without interruption including, for example, to be able to fix the bug offline.

Another issue if "unused bits" in a pointer are used as an index into a table of bounds information is that array indexing or pointer arithmetic may "overflow" into and corrupt an index value. In this case an out-of-bounds reference may not be detected if the index value is corrupted.

In this kind of system there is also a need to protect the integrity of the index value in a pointer. The present invention solves the above-mentioned problems without increasing the number of instructions executed.

An embodiment of the present invention provides precise protection where it protects every buffer with precision to the byte. The present system is applicable to C/C++ applications and other programs that may have memory issues, where there is arbitrary pointer arithmetic, and the number of buffers to be protected in one application may range from thousands to millions.

FIG. 1 illustrates an example of out-of-bounds references.

From using a tool, it was found that out-of-bounds references occurred in various string handling functions in the glibc library (GNU (GNU's Not Unix) C Library) for the Intel architecture. The glibc library provides a set of functions whose behavior is specified by the C programming language definition.

For example, a partially out-of-bounds reference is shown where a compiler created a speculative load of quad word 2. A fully out-of-bounds reference is shown where a compiler created a speculative load of quad word 4.

Many of these out-of-bounds references have existed for some time. They were introduced to improve performance and may or may not have caused security or other problems. While these bugs probably should be fixed, this may take some time.

In an embodiment, it is assumed that bounds information is available within load and store instruction at micro-architecture level. The microarchitectural level lies just below the ISA (Instruction Set Architecture) level in the abstraction hierarchy and hence is concerned with the implementation of the basic operations to be supported by the Computer as defined by the ISA. The ISA defines the types of instructions to be supported by the processor.

Figure 2:
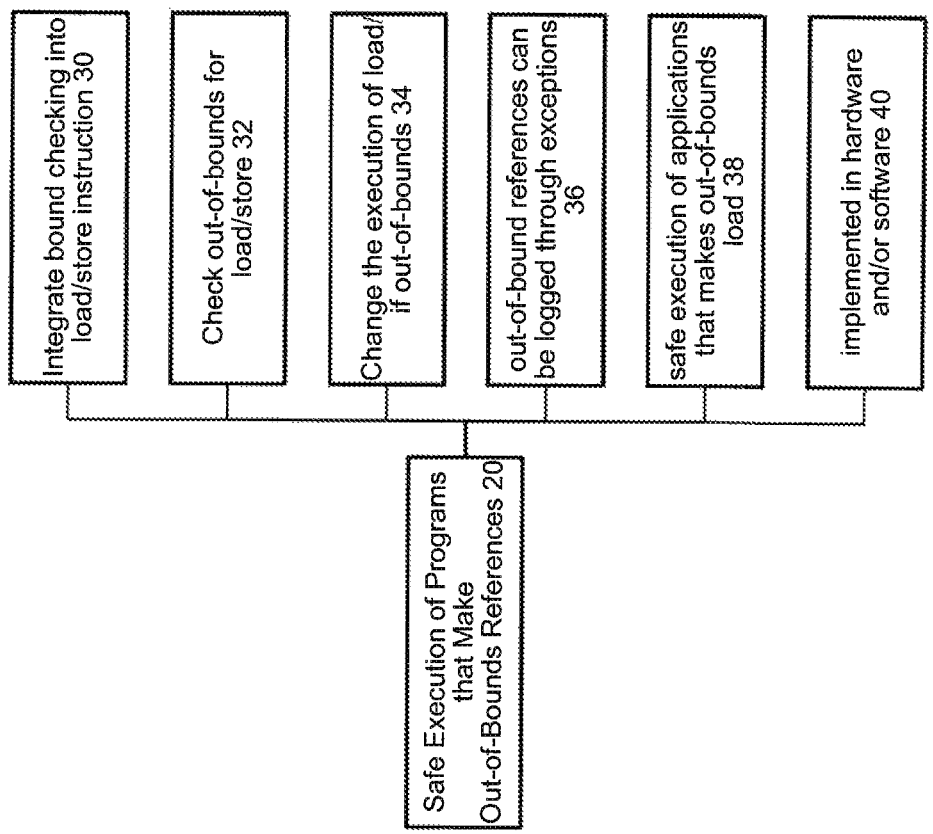
FIG. 2 illustrates an example, non-limiting method, in accordance with one or more embodiments described herein.

FIG. 2 illustrates an example, non-limiting method, in accordance with one or more embodiments described herein. In the embodiment, a program is able to safely execute load and store operations without interruption, while still allowing out-of-bounds references to be debugged at a later time. The bounds information is checked, and the behavior of the load and store operations are changed accordingly for safe execution.

In an embodiment, in order to provide safe execution of programs that make out-of-bounds references 20, there is integration of bounds checking into load and store instruction 30. In an embodiment, there is ability to check out-of-bounds for load and store 32. There is the ability to change the execution of load and store if out-of-bounds 34. Out-of-bounds references can be logged through exceptions 36. Safe execution of applications that makes out-of-bounds load 38. The method of an embodiment can be implemented in hardware and/or software 40. Thus, there is much flexibility in the embodiment.

Figure 3:
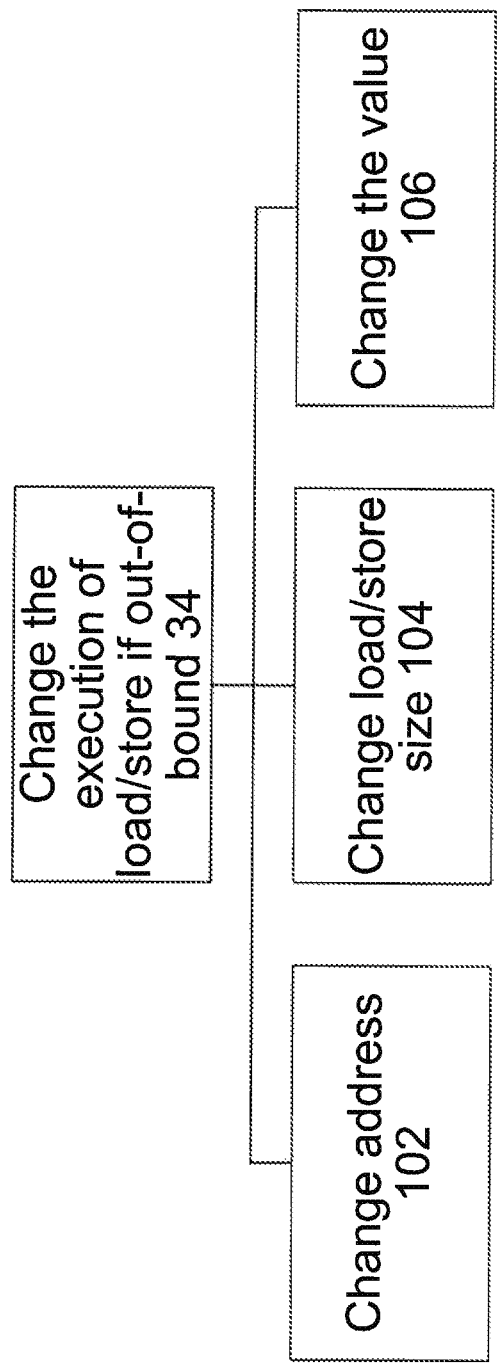
FIG. 3 illustrates an example, non-limiting method including change the execution of load and store, in accordance with one or more embodiments described herein.

FIG. 3 illustrates an example, non-limiting method including change the execution of load and store, in accordance with one or more embodiments described herein. Referring to FIG. 3, in an embodiment, there is the ability to change address 102 or load and store size 104. There is also the ability to change the value 106 returned for the out-of-bounds portion of a load instruction for protection and debugging.

Figure 4:
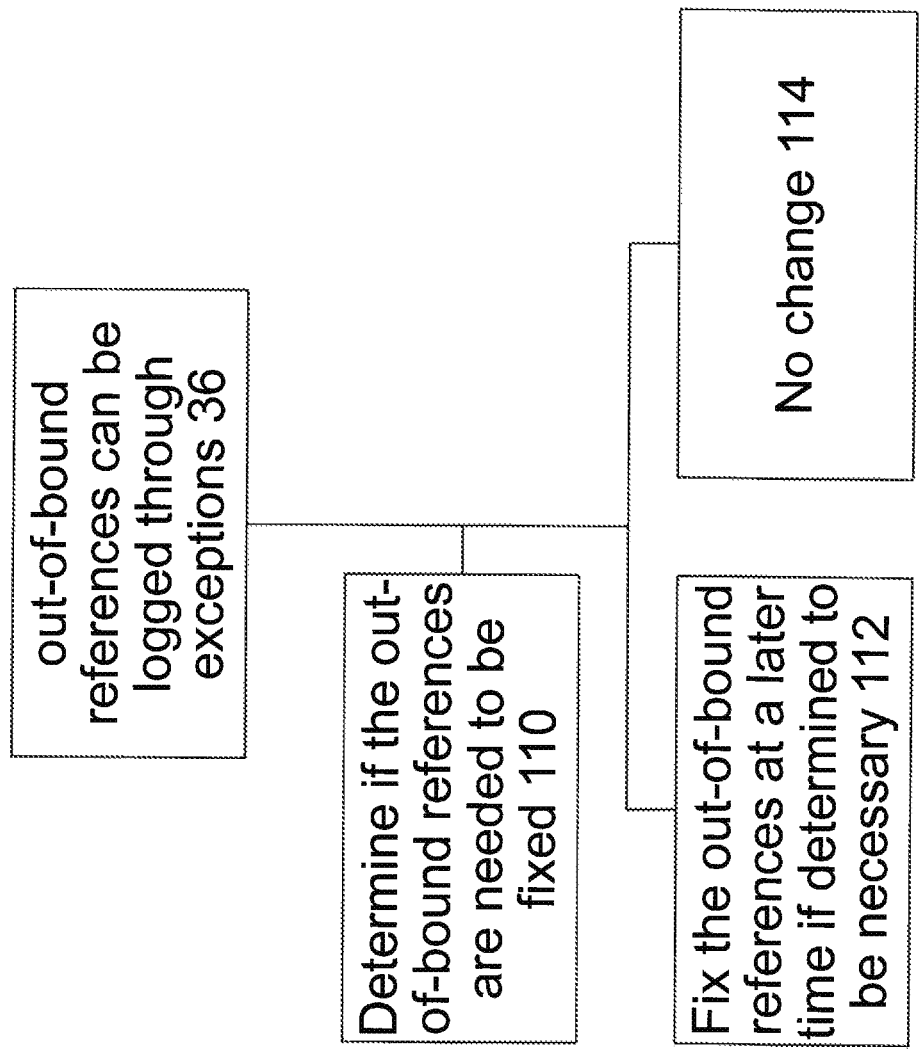
FIG. 4 illustrates an example, non-limiting method including out-of-bounds references can be logged through exceptions, in accordance with one or more embodiments described herein.

FIG. 4 illustrates an example, non-limiting method including out-of-bounds references can be logged through exceptions, in accordance with one or more embodiments described herein. Referring FIGS. 2 and 4, the out-of-bounds references can be logged through exceptions but do not cause aborting the execution 36. In an embodiment, there is a determination if the out-of-bounds references are needed to be fixed 110.

Therefore, in an embodiment, there is the ability to fix the out-of-bounds references later if needed 112 or no change to the out-of-bounds references 114 if there is no reason to fix as seen in FIG. 4.

In an embodiment, referring back to FIG. 2, there is an ability to achieve safe execution of applications that make out-of-bounds loads 38. Safe execution of applications and out-of-bounds references can be logged through exceptions. In an embodiment, there is the ability to have no secret revealed. In an embodiment, there is ability to keep the application running.

In an embodiment, there is ability to be implemented in hardware and/or software 40. In an embodiment, there is ability to be added in micro-architecture. In an embodiment, there is ability to be instrumented in program. The method of one or more embodiments can also be performed as a mix of both hardware and software.

Figure 5:
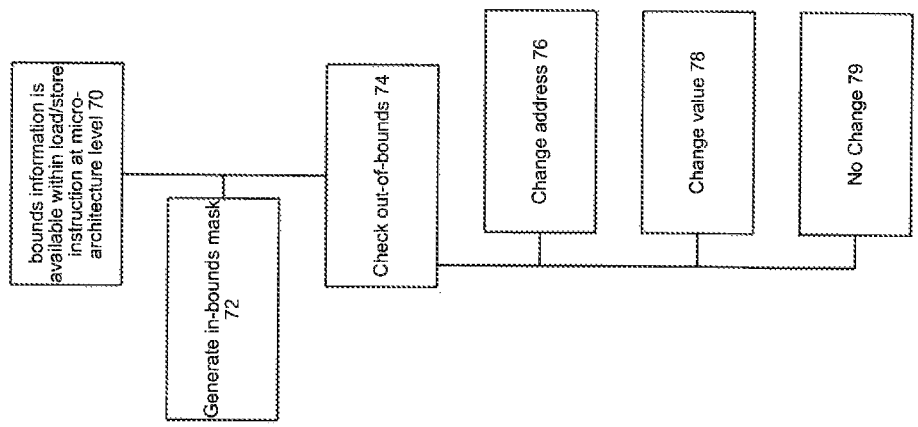
FIG. 5 illustrates an example, non-limiting method, in accordance with one or more embodiments described herein.

FIG. 5 illustrates an example, non-limiting method, in accordance with one or more embodiments described herein.

In an embodiment, it is assumed that bounds information is available within load and store instruction at micro-architecture level 70. The system can then generate an in-bounds mask 72 which helps to check out-bounds information as further detailed below. The system can check out-of-bounds information 74 from the in-bounds mask generated 72. In an embodiment, the address can be changed 76 and/or the number of bytes to be transferred can be changed to cover just the inbounds data. For example, if the instruction specifies a load address of p with size of 8 and if the buffer goes from p+4 to p+8, the start address of the load is changed to p+4 and the size to 4.

In an embodiment, the value returned on a load corresponding to the out-of-bounds information can be changed 78. In the case of a read/load, that is the instruction returns fake data (which could be all 0's, for example) in place of the real "out-of-bounds" data to avoid leaking sensitive information. However, in an embodiment, the system does not change out-of-bounds information on a write/store since that could corrupt valid data 79.

Figure 6:
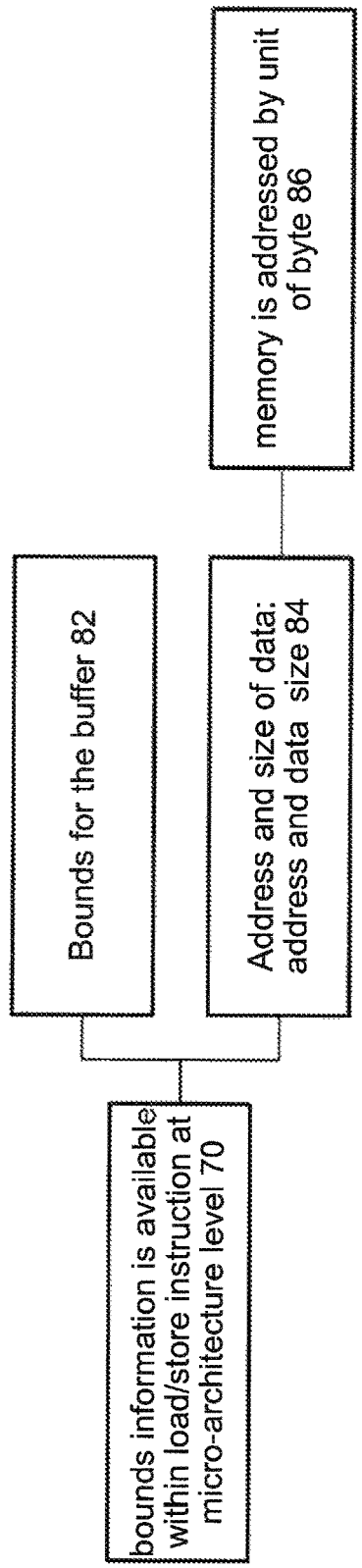
FIG. 6 illustrates an example, non-limiting method including the bounds information being available, in accordance with one or more embodiments described herein.

FIG. 6 illustrates an example, non-limiting method including the bounds information being available, in accordance with one or more embodiments described herein. In an embodiment, it is assumed that bounds information is available within load and store instruction at the micro-architecture level 70. The bounds for the buffer can be a lower bounds (LB) and an upper bounds (UB) 82.

Figure 7:
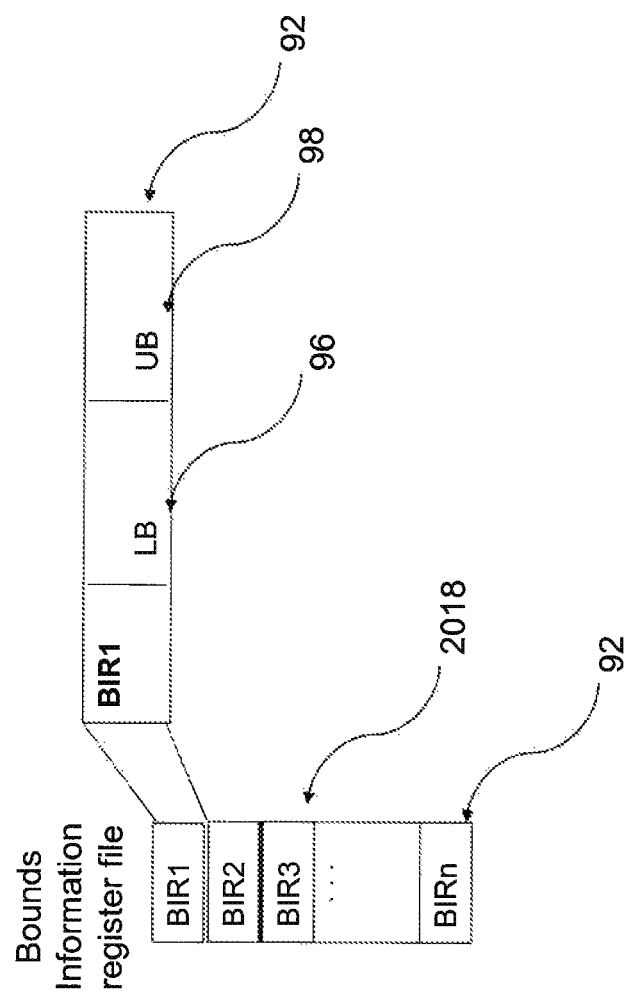
FIG. 7 illustrates an example, non-limiting bounds information register file, in accordance with one or more embodiments described herein.

FIG. 7 illustrates an example, non-limiting bounds information register file, in accordance with one or more embodiments described herein.

Referring to FIG. 7, each BI (Bounds Information) register 92 of the bounds information register file 2018 has, for example, at least three fields: (index 94, LB (lower bounds) 96, UB (upper bounds) 98). As seen in the example, the upper bounds (UB) 98 is the right most cell.

The "unused bits" in a pointer can be re-purposed to check or keep track of a range of addresses that can be accessed via the pointer. For example, in 64-bit architectures, object-pointers have unused bits, as they generally store virtual-addresses with 48-bits of information or less. The disclosed techniques can leverage these unused bits to keep a copy of the index as discussed later.

Referring back to FIG. 6, the address and size of data to be loaded or stored are available from the load or store instruction 84. In an embodiment, size of the data is expressed in bytes 86.

Figure 8:
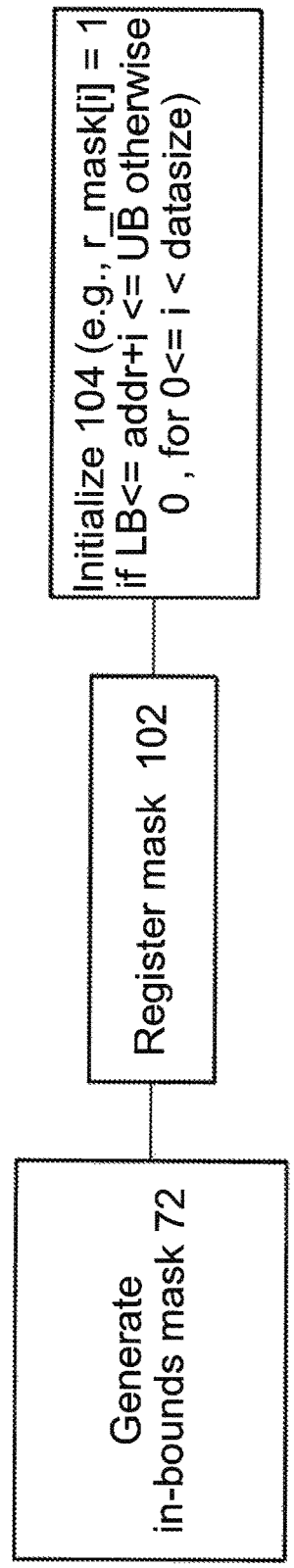
FIG. 8 illustrates an example, non-limiting method including generating in-bounds mask, in accordance with one or more embodiments described herein.

FIG. 8 illustrates an example, non-limiting method including generating in-bounds mask, in accordance with one or more embodiments described herein.

Figure 9:
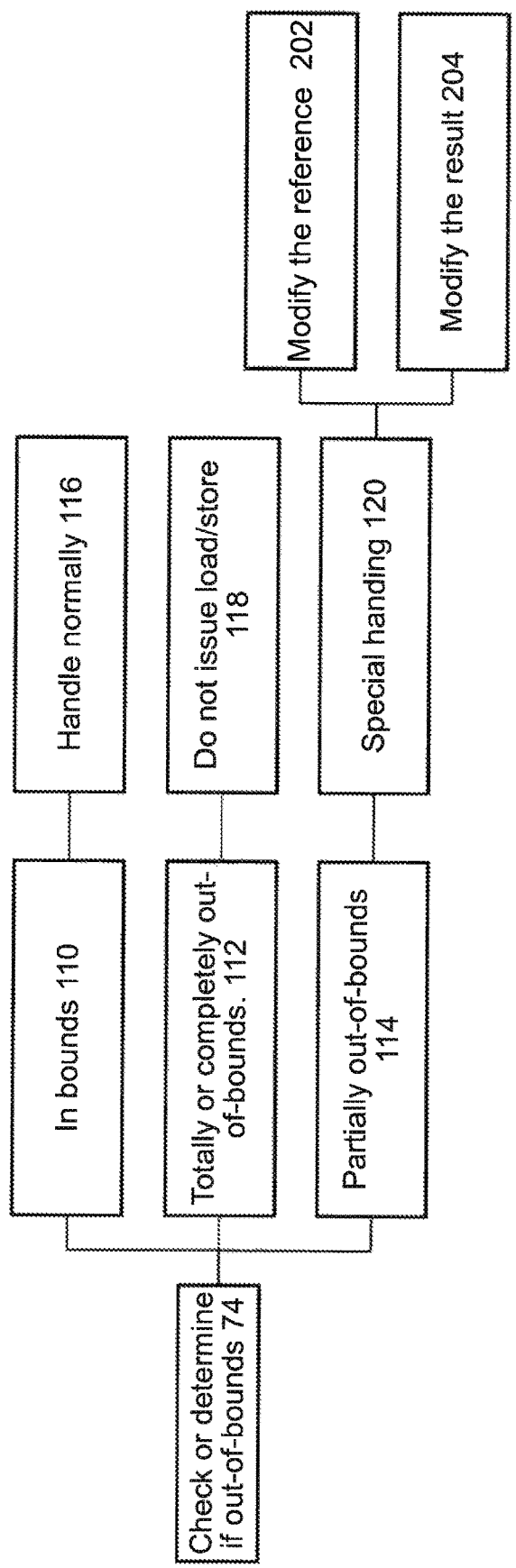
FIG. 9 illustrates an example, non-limiting method including check out-of-bounds, in accordance with one or more embodiments described herein.

In an embodiment a system generates an in-bounds mask 72 as follows. The system can check out-of-bounds information 74 from the in-bounds mask generated 72. The system registers, for example, r_mask 102, when the bit is "one" in the mask then the corresponding byte of data for reference is in bounds. The entry in the r_mask is "zero" if it is out of bounds. The system then initializes the mask 104 in the following example where the address is greater than or equal to the lower bounds (LB) and less than or equal to the upper bounds (UB), where variable "i" is equal to or greater than zero and less than the data size:
Initialize: r_mask[i]=1 if LB<=addr+i<=UB otherwise 0, for 0<=i<datasize FIG. 9 illustrates an example, non-limiting method including check out-of-bounds, in accordance with one or more embodiments described herein.

In an embodiment, the out of bounds are checked or determined 74 by the system. The system determines that the data is in-bounds 110 if r_mask[0: datasize) is all "1". Therefore, when all the entries in the r_mask is "1", then it is all in bounds. Then, the reference is handled normally 116.

A load or store to a buffer is partially out-of-bounds if the addresses specified in the load or store include some addresses that are within the bounds of the buffer and some addresses that are not within the bounds of the buffer. A load or store to a buffer is totally or completely out-of-bounds if the addresses specified in the load or store are all outside the bounds of the buffer.

The system determines that the corresponding data is totally or completely out-of-bounds if the entries in the mask are all zero 112. If r_mask[0: datasize) is all 0, then it is determined that the corresponding data is totally out-of-bounds. Then, the system does not issue a load and store command 118. The system determines that the corresponding data is partially out-of-bounds 114 if the mask contains entries that are both "zero" and "one" (i.e., if r_mask[: datasize) contains both 0 and 1). When the system determines the corresponding data is partially out-of-bounds 114, the system issues a special handing instruction 120.

Concerning the special handling of instructions 120, there are at least two approaches to handle partial out-of-bound. One approach is to modify the reference by modifying data address and/or the size of the reference, using several modified references if needed 202. Another approach is to modify the result: (for read) mask out the out-of-bound value so that they are not revealed 204.

Figure 10:
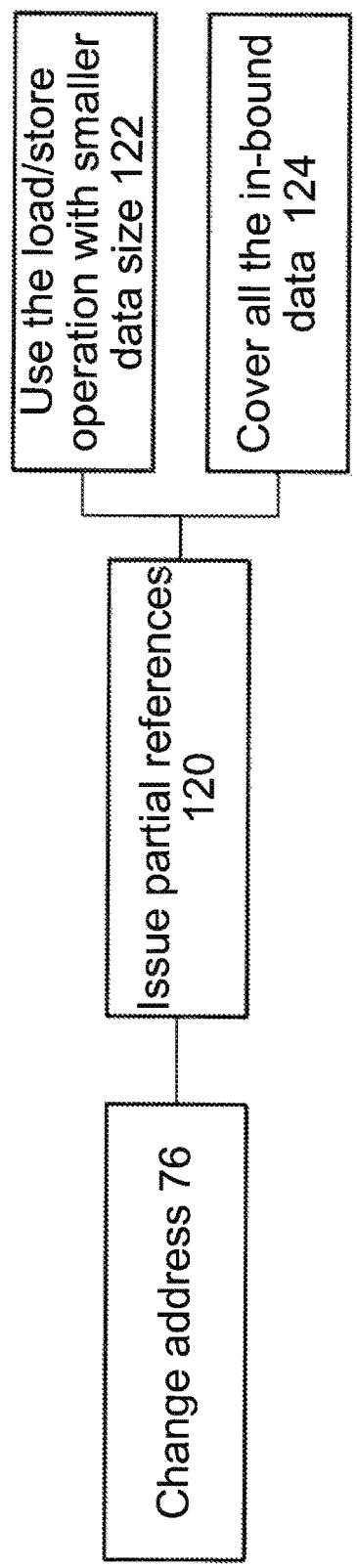
FIG. 10 illustrates an example, non-limiting method including change of address, in accordance with one or more embodiments described herein.

FIG. 10 illustrates an example, non-limiting method including change of address, in accordance with one or more embodiments described herein.

The system changes the address 76 as follows. There may be some limitation on data size for load/store instruction supported by hardware. Merely changing the address and size may not work.

The system issues partial references 120. In one approach, the system uses the load and store operation with smaller data size supported by the system 122, such as one-byte size shown in the following example.

For example, if the original reference is of size 8 bytes and only the first 3 bytes are in-bound, most hardware does not support a reference of size 3 bytes. The system will have to issue three one-byte reference according to the mask value.

The in-bound bytes might be any place in the data. The system just scans the mask and issues byte size reference accordingly. If the lower bound/upper bound representation is assumed, the in-bound bytes will be contiguous. The methods shown in the example embodiments are not limited to this assumption.

In another approach, the system covers all the in-bounds data with one or more operations 124 as follows:

```
For (i =0 ; i < datasize; i++) {
    if r_mask[i] == 1
    issue a byte reference for addr+i with/for corresponding data
}
For load, assembly the final result.
```

This is the second approach. For example, if the original load is of size 8 bytes and only the first 3 bytes are in-bound, the load is issued without modification and there is an 8-bytes result. The system should not give all the 8 bytes to user, but only the first 3 bytes. For the rest of the 5 bytes, the system can either replace the value with zeros or random values. The mask value is used to guide such replacement.

Detail for this example, assume the return value is 0x0102030405060708 (two digits in hexadecimal for a byte). The mask should be 11100000 in binary. Guided with mask, the result value can be changed to 0x0102030000000000 if we use zero.

Figure 11:
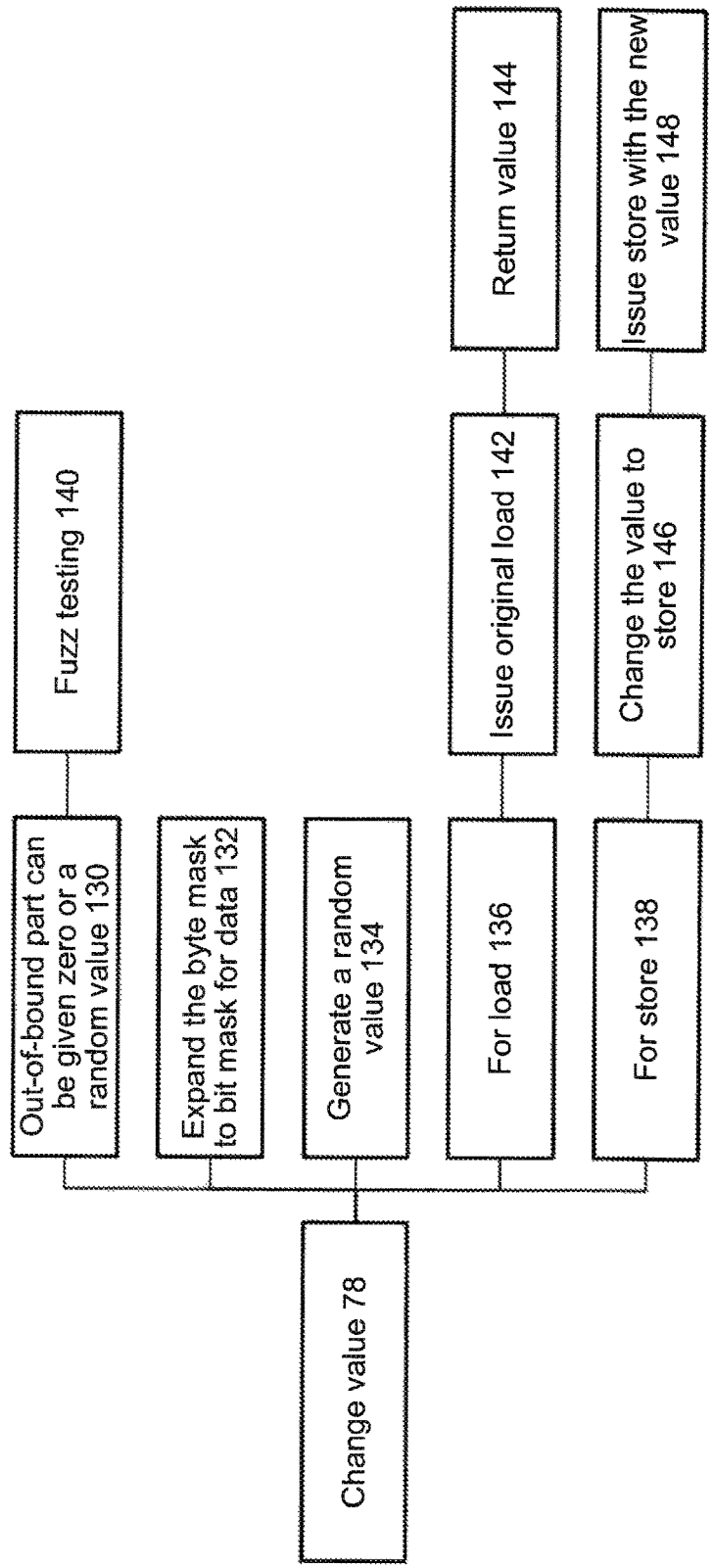
FIG. 11 illustrates an example, non-limiting method including change of value, in accordance with one or more embodiments described herein.

FIG. 11 illustrates an example, non-limiting method including change of value, in accordance with one or more embodiments described herein.

In an embodiment, the values are changed 78 as follows. The value for the in-bound part is kept intact so that the program can continue. The Out-of-bounds part can be given zero or a random value 130. For example, fuzz testing 140 can be used. Fuzzing or fuzz testing is an automated software testing technique that involves providing invalid, unexpected, or random data as inputs to a computer program. The program is then monitored for exceptions such as crashes, failing built-in code assertions, or potential memory leaks.

The following is the detail implementation. As mentioned previously, if r_mask[i] is 0, the corresponding byte (which is 8 bits) in the data should be 0. In the previous example, d_mask will be 0xffffff0000000000. Therefore, (value & d_mask) will give: 0x0102030000000000.

The system expands the byte mask to bit mask for data 132 as follows:
d_mask[8*i+j]=r_mask[i] for i in r_mask range and 0<=j<8
Therefore, a new bit d_mask is generated by expanding the byte mask r_mask 132. The system generates a random value: random_v 134.

For the load 136, the system issues original load get r_value 142, and generates a return value, r_dest 144 where
r_dest=(r_value & d_mask)|(random_v & ~d_mask)

For the store 138, the system only stores the in-bound portion of the value to be stored 148.

Therefore, hardware and/or software solutions is provided to integrate out-of-bounds check with load and store instruction. In the embodiments, the systems are able to safely execute out-of-bounds load and store instructions without termination and without revealing/modifying out-of-bounds values. A random value can be inserted into the out-of-bounds portion on a load, as shown above, for better vulnerability detection and debugging. The embodiments are able to handle partial and fully out-of-bounds load and store safely.

Figure 12:
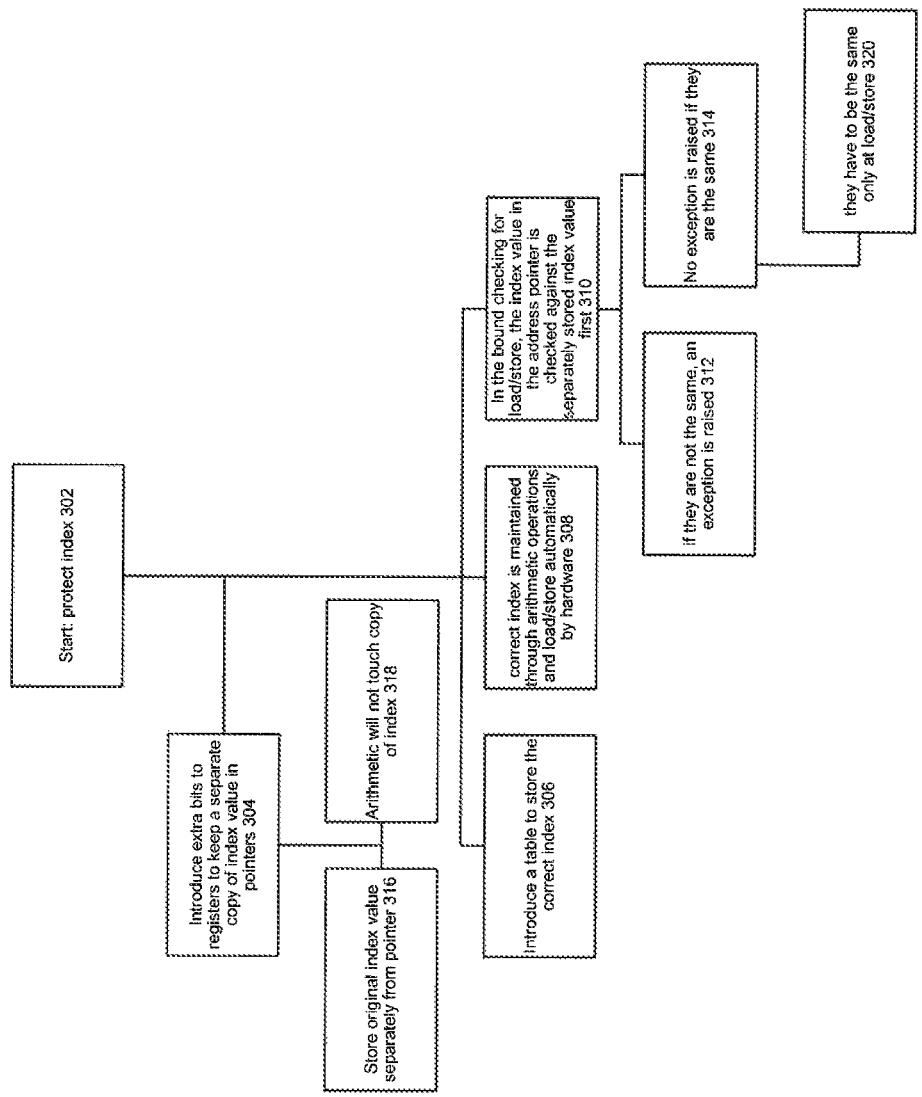
FIG. 12 illustrates an example, non-limiting method of protecting an index in accordance with one or more embodiments described herein.

FIG. 12 illustrates an example, non-limiting method of protecting an index in accordance with one or more embodiments described herein.

As mentioned previously, there are problems in the current systems since index bits may be changed by pointer arithmetic operations. Moreover, out-of-bounds access may not be detected due to the corrupted index. In order to solve these issues, an embodiment protects the index.

The system starts to protect the index in 302. The system introduces extra bits to registers to keep a separate copy of index value in the pointers 304. In an embodiment, the system stores the original index value separately from pointer 316. Additionally, with the separate copy, the arithmetic operations will not touch this copy of index 318.

The system introduces a table to store the correct index when a corrupted pointer is stored to the memory 306. The correct index is maintained through arithmetic operations and load and store automatically by hardware 308. In the bounds checking for load and store operations, the index value in the address pointer is checked against the separately stored index value first 310. If it is determined that the index value in the address pointer and the separately stored index value are not the same, an exception is raised 312.

If it is determined that the index value in the address pointer and the separately stored index value are the same, no exception is raised 314. The index value in the address pointer and the separately stored index value have to be the same only at load and store operations 320.

Figure 13:
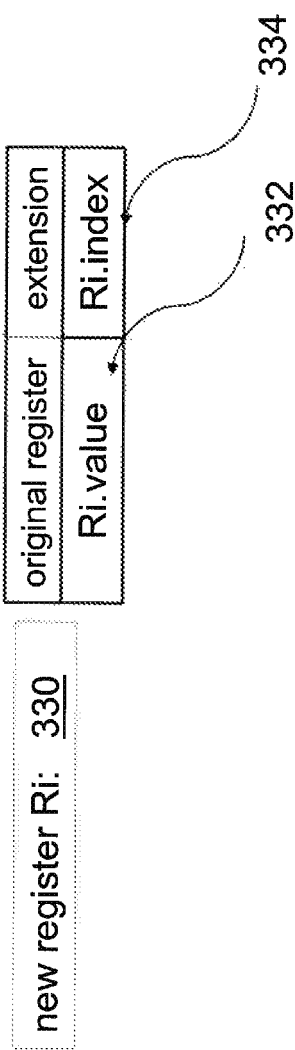
FIG. 13 illustrates an example, non-limiting illustration of the register, in accordance with one or more embodiments described herein.

FIG. 13 illustrates an example, non-limiting illustration of the register, in accordance with one or more embodiments described herein.

For example, the new register would be Ri 330, which includes the original register Ri.value 332 and the extension of the register Ri.index 334 (where i is an integer representing the register number), which will be explained more in the following. With the extension Ri.index 334, the index is protected by having a separate copy of the index.

Figure 14:
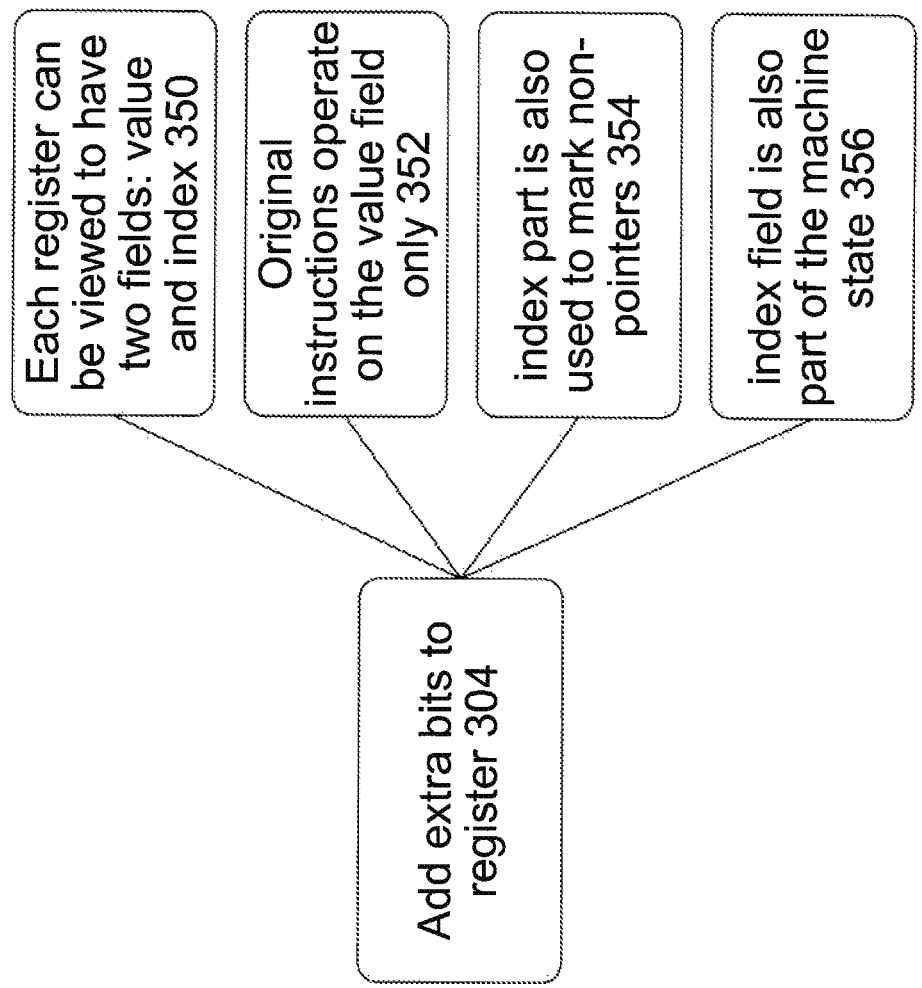
FIG. 14 illustrates an example, non-limiting illustration of adding extra bits to the register in accordance with one or more embodiments described herein.

FIG. 14 illustrates an example, non-limiting illustration of adding extra bits to the register in accordance with one or more embodiments described herein.

The system introduces extra bits to the registers 304 to hold a copy of the index value. Each register can be viewed to have two fields at 350: value (i.e., Ri.value 332) and index (Ri.index 334). For example, the fifth register R5 has two fields: R5.value and R5.index, where i=5. The original instructions operate on the value field (Ri.value 332) only 352. Additional operations on the index field (Ri.index 334) will be specified in this disclosure.

The index part (Ri.index 334) is also used to mark non-pointers 354. The index part can be set to "NONE" as further described below.

The index field (Ri.index 334) is also part of the machine state 356. The index field (Ri.index 334) is to be saved and restored at context switching. A context switch is the process of storing the state of a process or thread, so that it can be restored and resume execution at a later point. This allows multiple processes to share a single central processing unit (CPU) and is an essential feature of a multitasking operating system.

Figure 15:
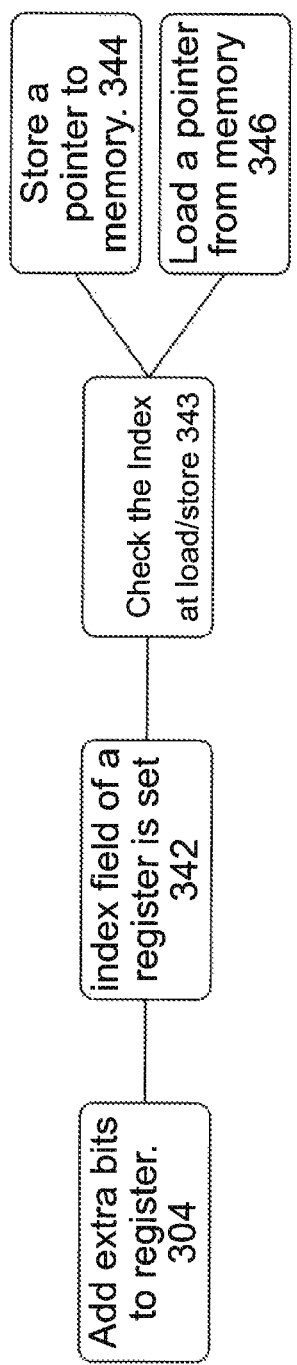
FIG. 15 illustrates an example, non-limiting method in accordance with one or more embodiments described herein.

FIG. 15 illustrates an example, non-limiting method in accordance with one or more embodiments described herein.

Extra bits are added to the register to create a new register 330 at 304. The index field Ri.index 334 of a register Ri 330 is set at 342. At the load and store, the system checks the index 343. The system stores a pointer to memory 344, and loads a pointer from memory 346, which will be explained further in the following.

Figure 16:
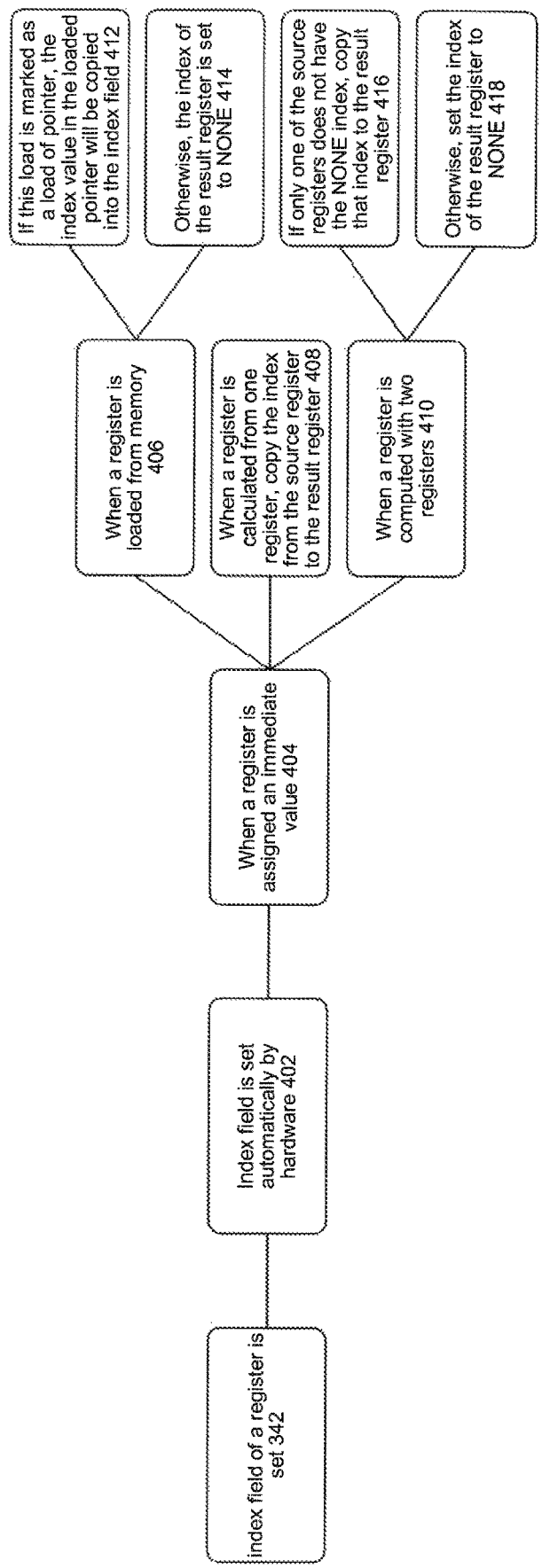
FIG. 16 illustrates an example, non-limiting method including setting an index field in accordance with one or more embodiments described herein.

FIG. 16 illustrates an example, non-limiting method including setting an index field in accordance with one or more embodiments described herein.

The setting of the index field of the register begins at 342. The index field is set automatically by hardware 402. When a register is assigned an immediate value, the index of the result register is set to "NONE" 404. For example, when the fifth register value is R5=10, then the index is set as follows: R5.index=NONE.

When a register is loaded from memory 404, then if this load is marked as a load of a pointer, the index value in the loaded pointer will be copied into the index field of the result register 412. For example, when R5=load pointer R3:R5.index=get the index from pointer value (denoted as Index(R5.value)). Otherwise, the index of the result register is set to "NONE" at 414. For example, R5=load R3:R5.index=NONE.

When a register is calculated from one register 408, the system copies the index from the source register to the result register. For example, R5=add R3, 100:R5.index=R3.index.

When a register is computed with two registers 410, if only one of the source registers does not have the "NONE" index, the system copies that index to the result register 416. For example, If R5=Add R3, R4 and R3.index!=NONE and R4.index==NONE, R5.index=R3.index.

Figure 17:
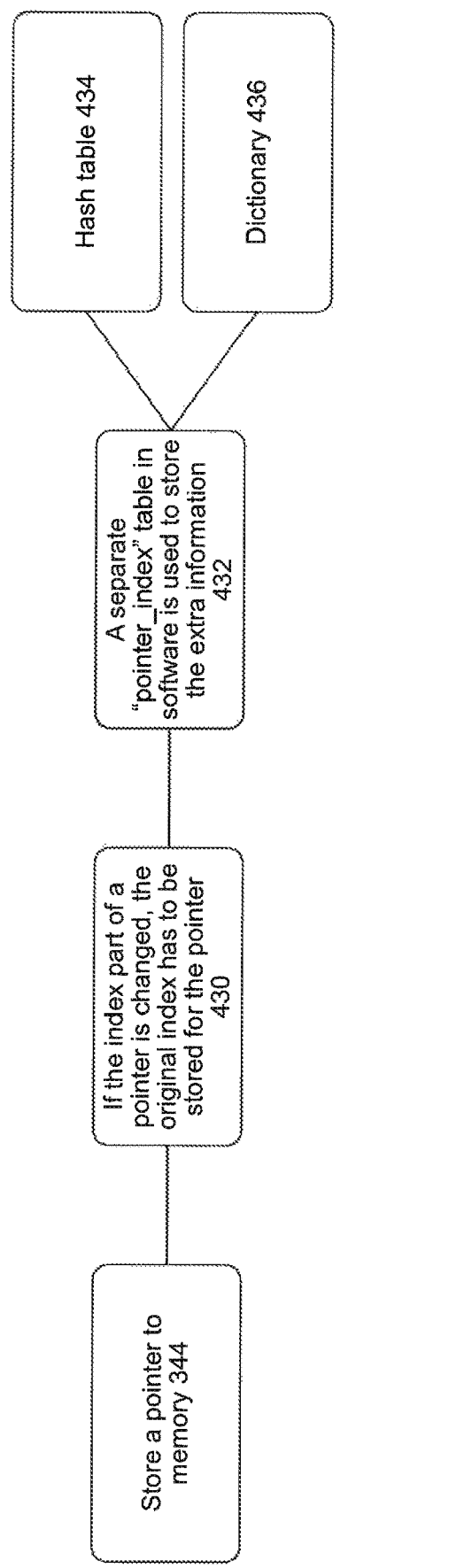
FIG. 17 illustrates an example, non-limiting method including storing a pointer to memory in accordance with one or more embodiments described herein.

Otherwise, the system sets the index of the result register to "NONE" 418. For example:
If R5=Add R4, R3, and R4.index==NONE and R3.index==NONE, R5.index=NONE
If R5=sub R4, R3, and R4.index!=NONE and R3.index!=NONE, R5.index=NONE FIG. 17 illustrates an example, non-limiting method including storing a pointer to memory in accordance with one or more embodiments described herein.

The system starts storing a pointer to the memory 344. If the index part of a pointer is changed, then the original index has to be stored for the pointer 430. A separate "pointer_index" (pointer index) table in software is used to store the extra information 432. The table can be a hash table 434 or dictionary 436, or any other type of table.

The Pseudo code for store a pointer to memory is as follows:

```
// store Rx, Ri
check bounds for Rx, the address;
write the value of Ri to the address in Rx;
if (Ri.index != index(Ri.value)) { // the index is corrupted
    pointer_index[Ri.value] = Ri.index;
}
```

Figure 18:
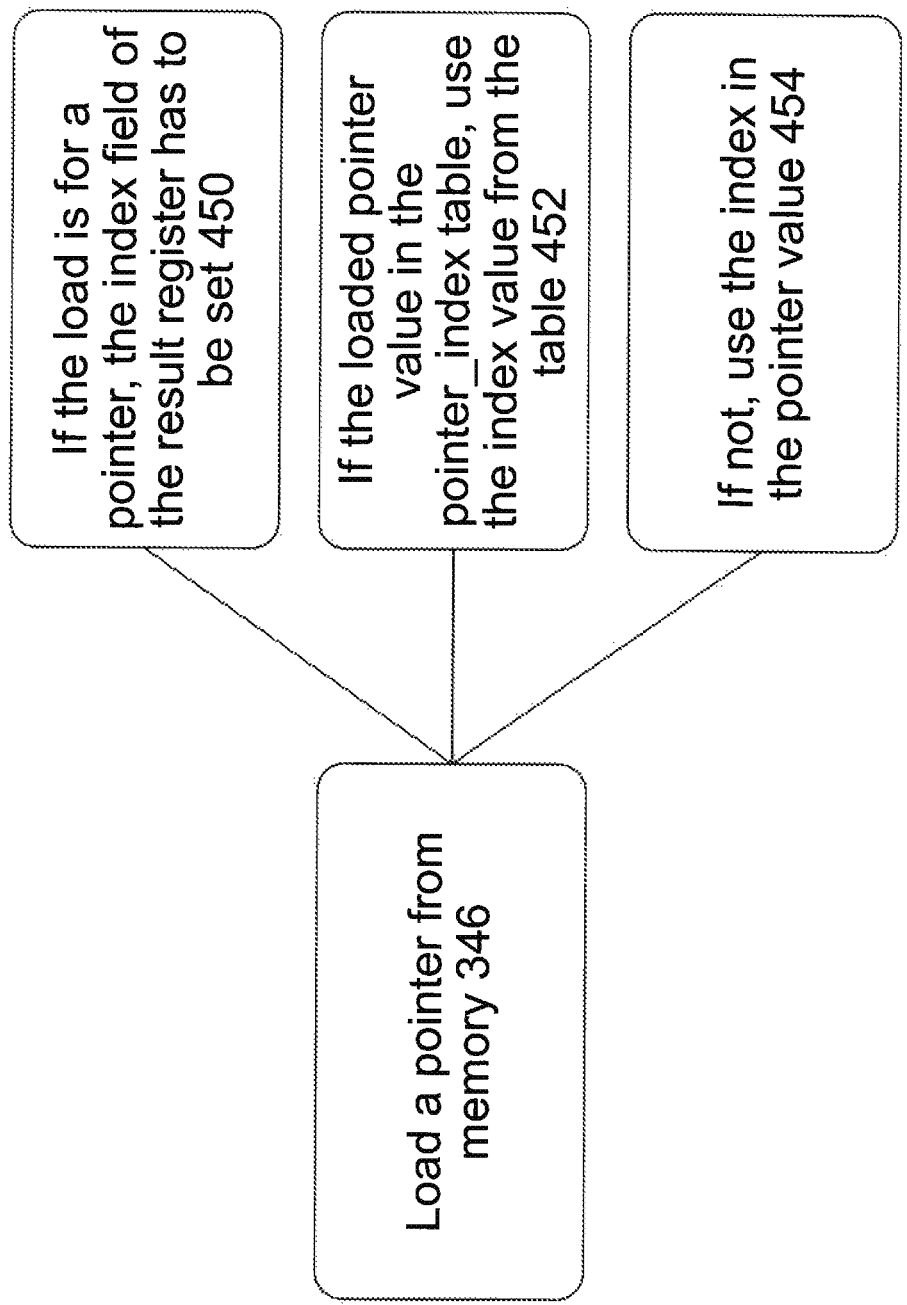
FIG. 18 illustrates an example, non-limiting method including loading a pointer from memory in accordance with one or more embodiments described herein.

FIG. 18 illustrates an example, non-limiting method including loading a pointer from memory in accordance with one or more embodiments described herein.

Loading a pointer from memory starts at 346. If the load is for a pointer 346, then index field of the result register has to be set 450. If the loaded pointer value is in the pointer_index table, the system then uses the index value from the table 452. If not, then the system uses the index in the pointer value 454.

The pseudo code for load a pointer from memory is as follows:

```
// Ri = load Rx
check bounds for Rx, the address;
read the value from the address in Rx into Ri.value field
if (pointer_index[Ri.value] != NULL) { // the index is corrupted
    Ri.index = pointer_index[Ri.value];
} else {
    Ri.index = index(Ri.value);
}
```

Figure 19:
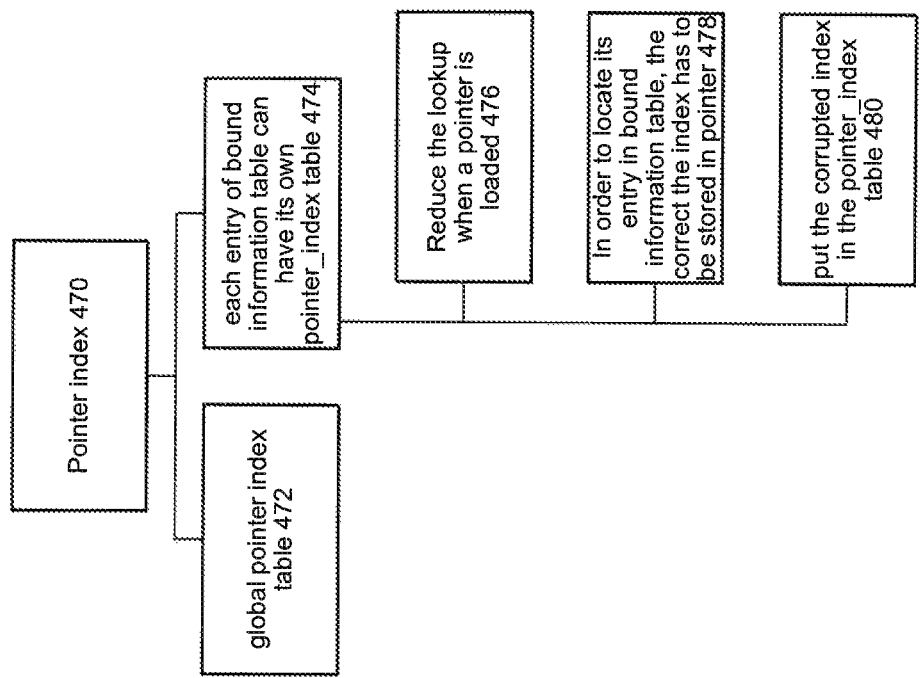
FIG. 19 illustrates an example, non-limiting method including generating the pointer index in accordance with one or more embodiments described herein.

FIG. 19 illustrates an example, non-limiting method including generating the pointer index in accordance with one or more embodiments described herein.

In an alternative embodiment, instead of using a global pointer_index table 472 to generate the pointer index 470, each entry of bounds information table can have its own pointer_index table 474. This then reduce the lookup when a pointer is loaded 476. In order to locate its entry in bounds information table, the correct index has to be stored in pointer 478. The system places the corrupted index in the pointer_index table 480.

An example pseudo code for storing would then be as follows:

```
// store Rx, Ri
check bounds for Rx, the address;
write (Ri.index, addr(Ri.value)) to memory address in Rx;
if (Ri.index != index(Ri.value)))
    BI_table[Ri.index].pointer_index[address(Ri.value)] =
        index(Ri.value)
}
```

An example pseudo code for loading would then be as follows:

```
// Ri = load Rx
check bounds for Rx, the address;
read the value from the address in Rx into Ri.value field;
Ri.index = index(Ri.value);
    temp = BI_table[Ri.index].pointer_index[address(Ri.value)]
    if (temp != NULL) { // the index is corrupted
        index(Ri.value) = temp;
```

Figure 20:
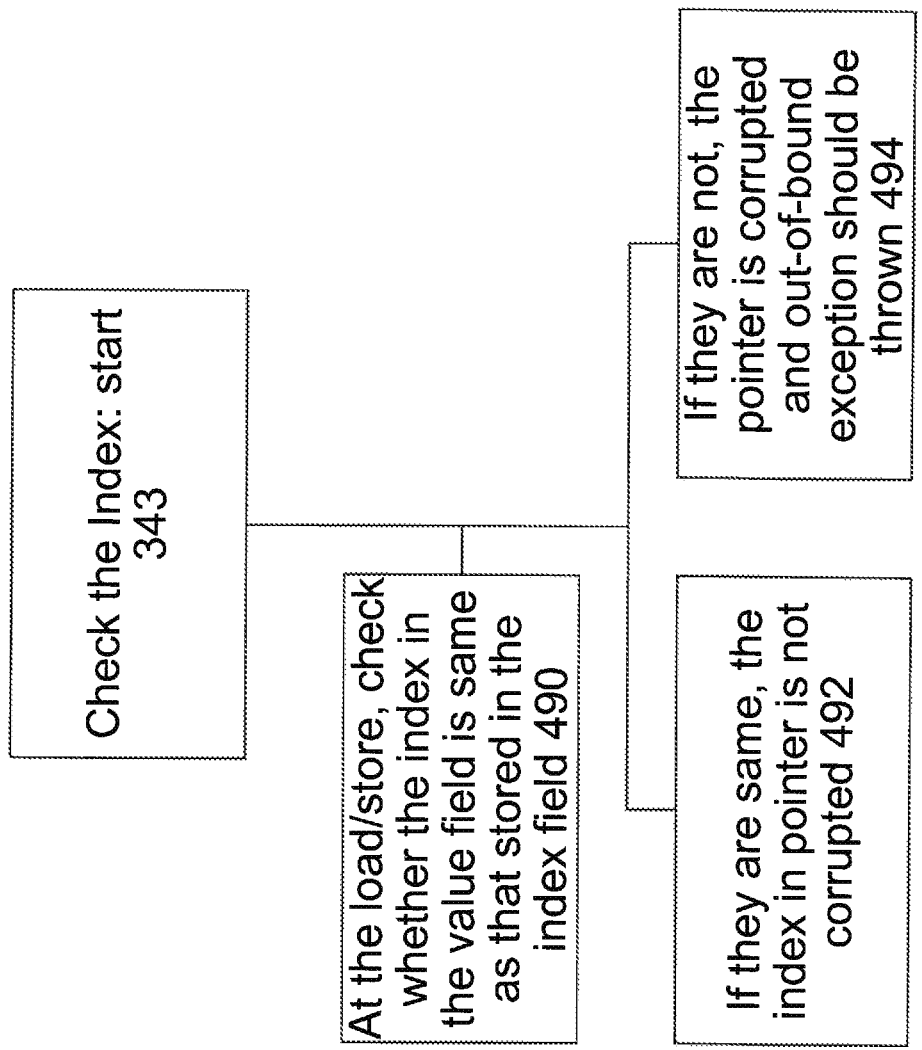
FIG. 20 illustrates an example, illustration of checking the index in accordance with one or more embodiments described herein

FIG. 20 illustrates an example, illustration of checking the index in accordance with one or more embodiments described herein.

At the load and store, the system checks 343 whether the index in the value field is the same as that stored in the index field 490. For example:

For R5=load R3, check whether value of the unused bits in R3.value (Index(R3.value)) is the same as R3.index If the index in the value field is the same as that stored in the index field, the index in pointer is not corrupted 492. If the index in the value field is not the same as that stored in the index field, the pointer is corrupted and out-of-bounds exception should be thrown out 494.

Figure 21:
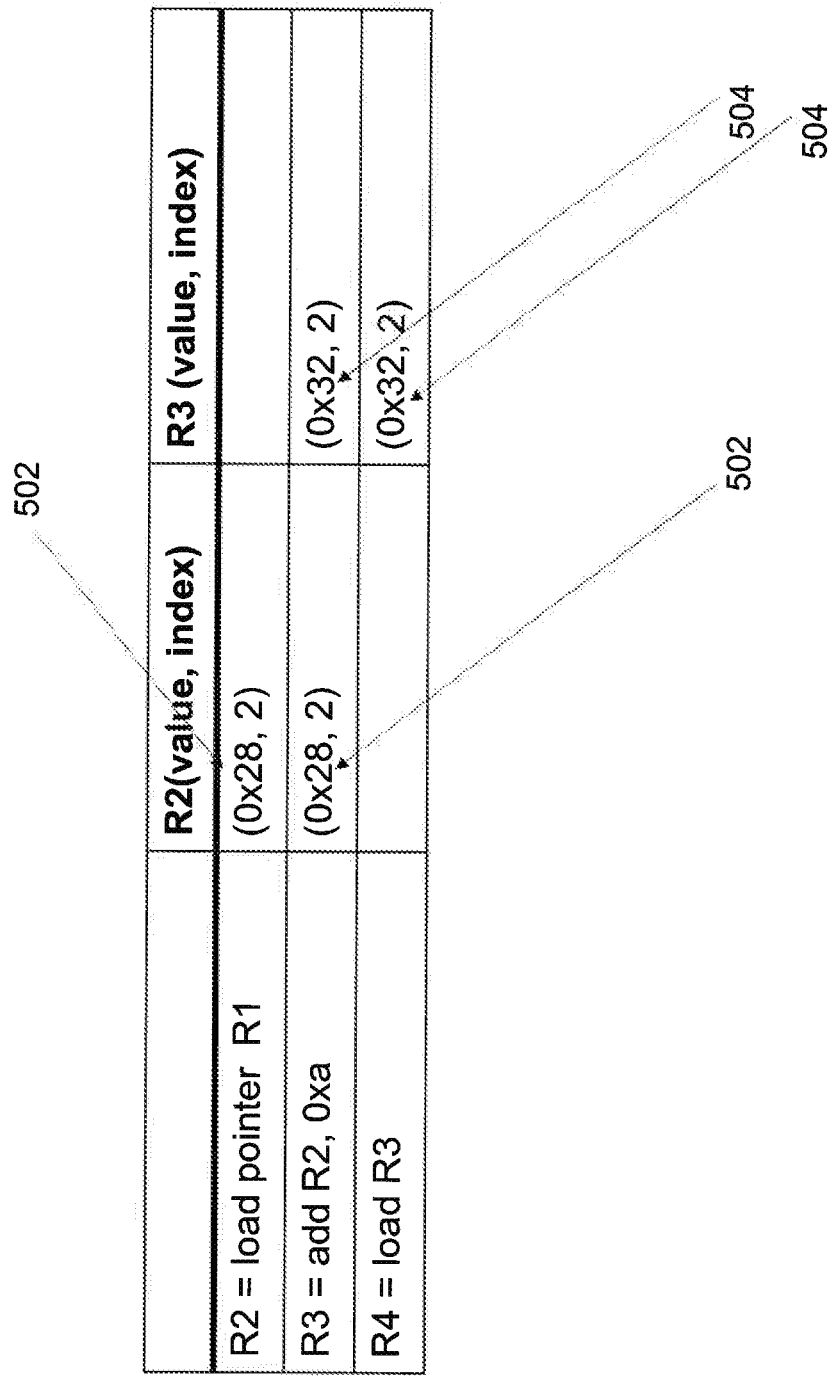
FIG. 21 illustrates register values as example of protection in accordance with one or more embodiments described herein.

FIG. 21 illustrates register values as example of protection in accordance with one or more embodiments described herein.

In this example it is assumed that address is 2 bytes and the first byte is unused/index bits. For example, the Index (R.value) is the first byte, highlighted and noted with references 502 and 504. There is a pointer with value "0x28", and index value "2" as seen in FIG. 21.

The check load is as follows:
Index(R3.value)=3
R3.index=2

Thereby, error is detected. Without the disclosed embodiments, the address value of R3 is 2, which might be within the bounds specified by BI_table (Bounds information table) for index=3.

FIG. 22 illustrates register values as example of protection in accordance with one or more embodiments described herein.

It is assumed that R3 is stored to memory at [3] after added with a huge number at [2]. Since the index is corrupted, the pointer_index table is used to store the correct index. If this pointer is loaded to R2 later in the execution, the correct index can be obtained from the pointer_index table. The system checks load from R3 at [6] after the subtraction at [5].

Index(R3.value)=2 due to instruction [5]

There is no corruption of the index portion of the pointer at the time of this load even though for some period of time before that the index part of the pointer was corrupted.

The disclosed embodiments show adding a field to registers to store index for bounds information in pointers. The embodiments also show hardware supported index propagation for arithmetic instructions. In an embodiment, the store of a corrupted pointer to memory is provided with extra operations and the system sets the index field correctly when a pointer is loaded from memory. The modification of load and store to check the index value in the address register is to make sure the correct bounds information is used. If the index in pointer has been changed when the pointer is used for load and store address, an exception will be raised. The disclosed embodiments eliminate false positives and false negatives.

The disclosed embodiments protect the integrity of metadata for bounds checking for memory references. The disclosed embodiments protect the integrity of index to bounds information where the index uses "unused Bits" in an address to protect against Out-of-Bounds memory references. The disclosed embodiments use a secure copy of index values to protect the integrity of index values. The disclosed embodiments automatically propagate the secure copy through program execution. The disclosed embodiments include at load and store operations, automatically checking the index value in the pointer against the secure copy and raising an exception if they are different.

Figure 23:
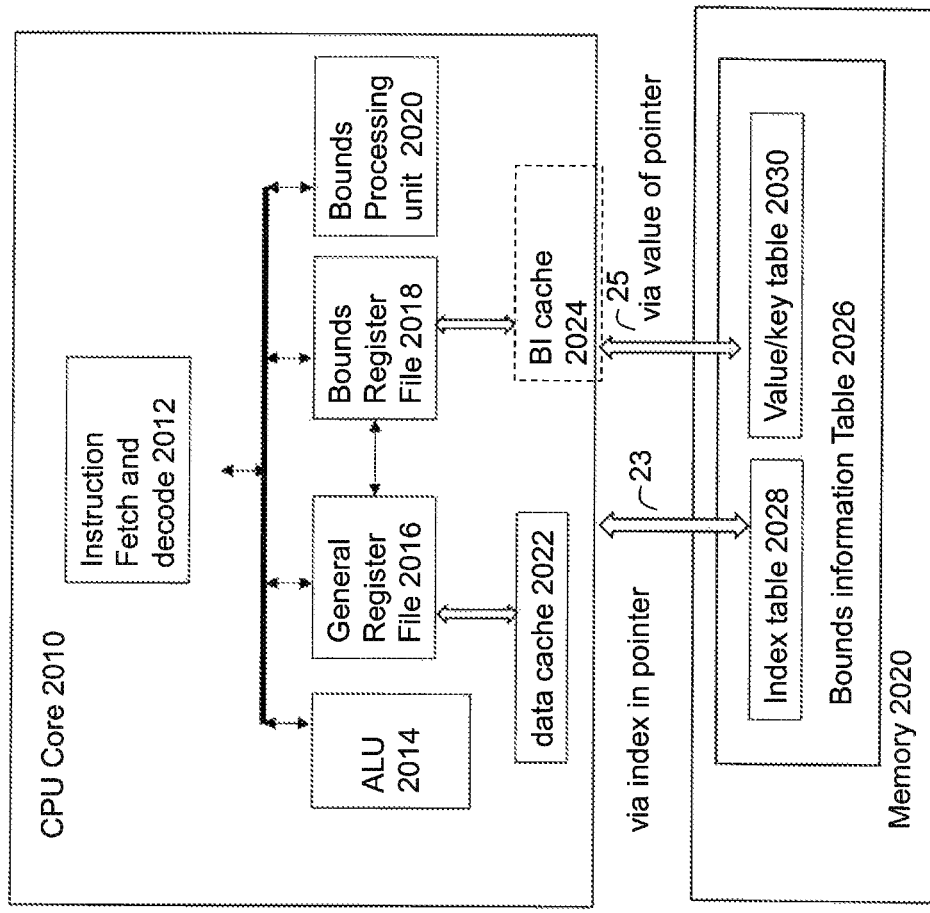
FIG. 23 illustrates an example, non-limiting system in accordance with one or more embodiments described herein.

FIG. 23 illustrates an example, non-limiting system in accordance with one or more embodiments described herein.

The system 2100 includes a CPU (central processing unit) core 2010 and a memory 2020. The CPU Core 2010 includes an instruction fetch and decode 2012, ALU (arithmetic logic unit) 2014, general register file 2016, bounds register file 2018, bounds processing unit 2020.

The system 2100 executes bounds-checking in hardware, such as the bounds processing unit 2020, on load and store instructions by using the index bits in an address to access the appropriate bounds-information. Therefore, as an example, the bounds processing unit 2020 can be used to implement the methods shown above, such as safe execution of programs that Make Out-of-Bounds references 20, as seen in FIGS. 2 through 11, and also protection of the index 302 as seen in FIGS. 12 through 22.

The general register file communicates with the data cache 2022, while the bounds register file 2018 is connected with the bounds information (BI) cache 2024. BI information can be cached within hardware organization 2100 in a dedicated cache (BI Cache 2024). The BI cache 2024 limits any slowdown from access to the BI table 2026 in memory 2020.

Referring back to FIG. 7, the bounds information register file 218 can include registers BIRn 92, that have lower bounds LB 96, and upper bounds UB 98 to provide the bounds information.

Referring to FIG. 23, the memory 2020 includes the bounds information table 2026 which includes the index table 2028 and a value/key table 2030 which can be used, for example, if the number of required bounds table entries exceeds the size of the index table. The bounds information table 2026 can have other configurations.

The CPU Core 2010 communicates information with the Index table 2028 and the Value/key table 2030. The CPU Core 10 provides via index in a pointer (path 2023) data to the index table 28, while providing data via value of the pointer (path 2025) to the value/key table 2030.

The bounds information (BI) includes a start address and length for each buffer or a start address and an end address for each buffer. The Index table 2028 includes access by index. The value/key table 2030 includes access with pointer value as the key. Instruction execution in the CPU Core 2010 includes BI registers 2018 to hold the bounds information. The system 2100 maintains a mapping between a general register in general register file 2016 and a bounds information register in the bounds register file 2018. The bounds information for the pointer in the register file 2018 can be located from original instructions. The bounds processing unit executes operations for bounds protection.

The bounds register file 18 is further detailed as follows. A register in the bounds register file 2018 (e.g., 128 bits,) stores bounds information including a start address and length, of a buffer. The system 2100 guarantees that the BI of a pointer in register 2018 can be found via a mapping, say FB:

$FB(R_n)=B_m$: means the BI for pointer in general register $R_n$ is in bounds register $B_m$. A simple mapping might be $FB(R_i)=B_i$ for all values of i.

Such mapping allows that bounds information can be accessed via pointer register. The system 2100 does not use a separate instruction to operate on bounds information as in MPX.

The bounds Information (BI) table 2026 is further detailed as follows. In one embodiment the BI table 2026 contains two sub-tables including an index table 2028 and the value/key table 2030. The bounds Information (BI) table 2026 can include other tables such as the pointer_index table discussed above.

Figure 24:
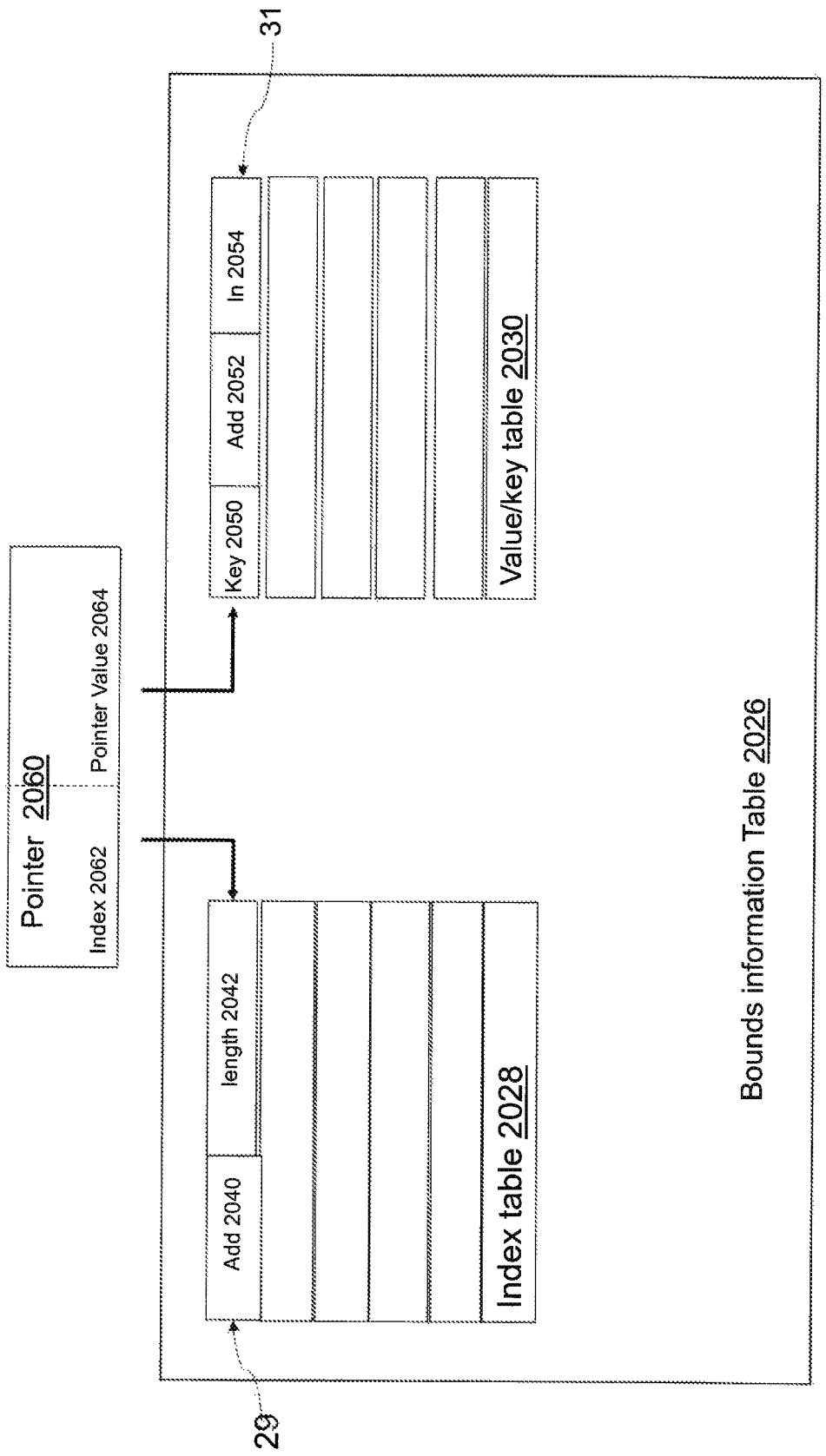
FIG. 24 illustrates an example, non-limiting illustration of a bounds information (BI) table in accordance with one or more embodiments described herein.

FIG. 24 illustrates an example, non-limiting illustration of a bounds information (BI) table in accordance with one or more embodiments described herein.

In the Index table 2028, each entry contains starting address 2040 and length 2042 of the buffer. Each entry in the Value/key table 2030 includes a pointer value (key) 2050, starting address 2052 and length of the buffer 2054. The value/key table 2030 can grow when needed and is looked up by a pointer value. The pointer value (key) 2050 can be obtained from the pointer value 2064 of a pointer 2060. The index 2062 of the pointer 2060 can be used to obtain the entries of the index table.

The Index table 2028 can be organized as a linear table including a plurality of BI entries 2029 with each BI entry including a base-address field 2040 and an object-size or length field 2042. Each BI entry 2029 of Index table 2028 can be associated with a heap object. Accessing a particular BI entry 2029 of index table 2028 corresponding to a given object can involve a single table-lookup. The single table-lookup can involve using an index 2062 that can be embedded into a pointer 2060 during object allocation.

Figure 25:
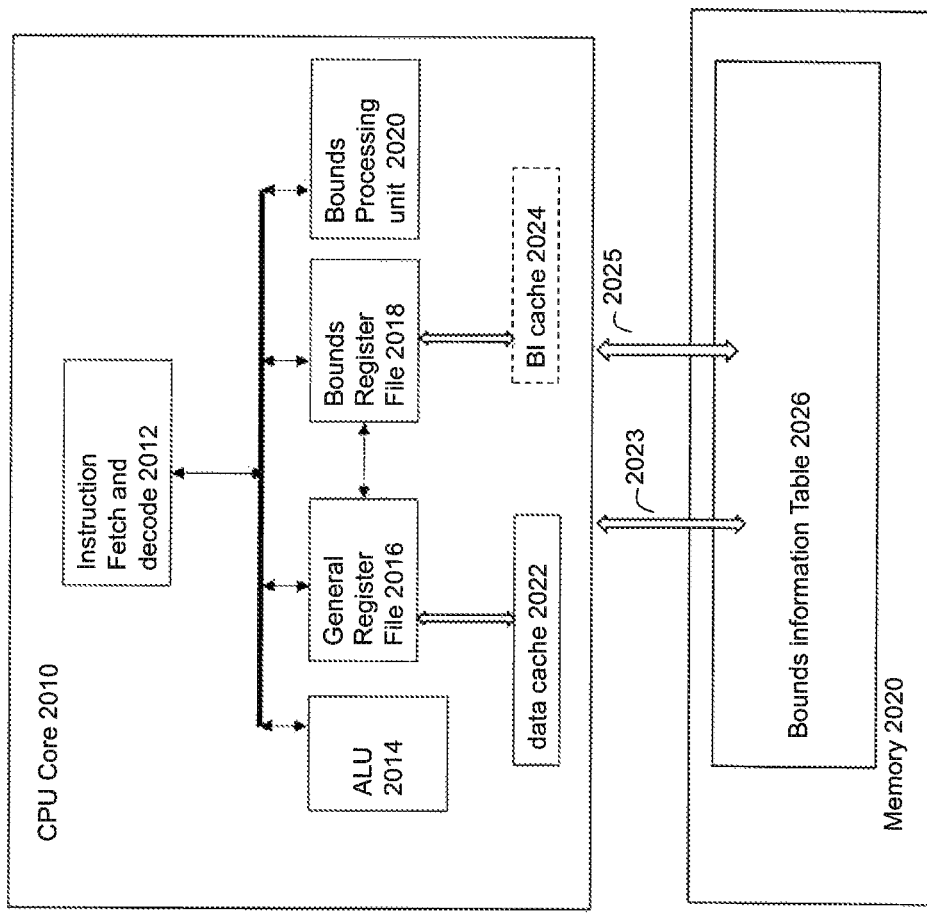
FIG. 25 illustrates an example, non-limiting system in accordance with one or more embodiments described herein.

FIG. 25 illustrates an example, non-limiting system in accordance with one or more embodiments described herein. This is a non-limiting example, and other configurations can be made. The system 2102 includes a CPU (central processing unit) core 2010 and a memory 2020. The CPU Core 2010 includes an instruction fetch and decode 2012, ALU (arithmetic logic unit) 2014, general file register 2016, bounds register file 2018, bounds processing unit 2020. The general file register communicates with the data cache 2022, while the bounds register file 2018 is linked with the bounds information (BI) cache 2024. The bounds information (or bounds-information) cache 2024 can be added to limit any slowdown from accesses to the bounds information table 2026 in memory 2020.

The system 2102 executes bounds-checking in hardware, such as the bounds processing unit 2020, on load and store instructions by using the index bits in an address to access the appropriate bounds-information. Therefore, as an example, the bounds processing unit 2020 can be used to implement the methods shown above, such as safe execution of programs that Make Out-of-Bounds references 20, as seen in FIGS. 2 through 11, and also protection of the index 302 as seen in FIGS. 12 through 22.

Figure 26:
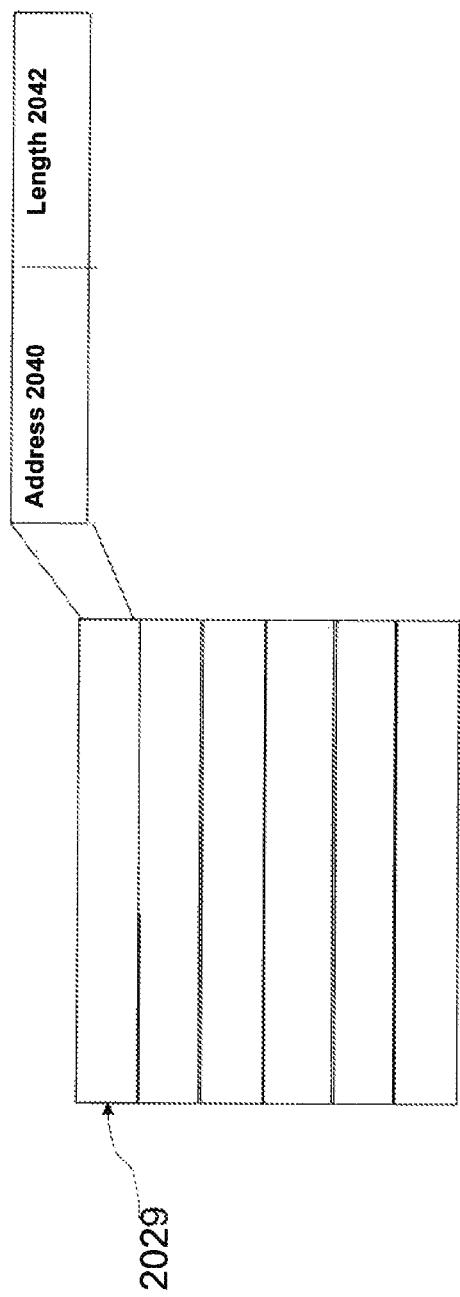
FIG. 26 illustrates an example, non-limiting illustration of a bounds information (BI) table in accordance with one or more embodiments described herein.

FIG. 26 illustrates an example, non-limiting illustration of a bounds information (BI) table in accordance with one or more embodiments described herein.

The BI table 2026 can be organized as a linear table including a plurality of BI entries 2029 with each BI entry including a base-address field 2040 and an object-size or length field 2042. Each BI entry of BI table 2026 can be associated with a heap object. Accessing a particular BI entry of the BI table 2026 corresponding to a given object can involve a single table-lookup. The single table-lookup can, for example, involve using an index that can be embedded into a pointer during object allocation.

Referring back to FIG. 25, the CPU Core 2010 communicates information with the BI table 2026 in memory via paths 2023 and 2025. Again, different configurations can also be provided as this is merely an example.

In general, the present invention introduces BI registers 2018 to hold bounds information (or called, e.g., boundary information or bounds-information). When the bounds information is loaded for bounds checking for load and store instruction, the system 2102 saves it into BI registers 2018.

The system 2102 avoid loads of BI for the load from the same buffer. The system 2102 is able to maintain BI register 2018 by hardware. The present invention is able to propagate the BI among the BI registers 2018 for pointers pointing to the same buffer, and not just using the same register. There are no extra instructions added in the code by present invention. The system 2102 loads BI register 2018 when the pointer is loaded from memory 2020. The present invention is able to prefetch BI to hide the latency, propagate BI to more pointers, and is helped by the compiler to avoid unprofitable prefetch.

The embodiment uses BI registers 2018 by load and store where bounds check with the BI register 2018 is by hardware and there is no change of code needed for such a check.

Figure 27:
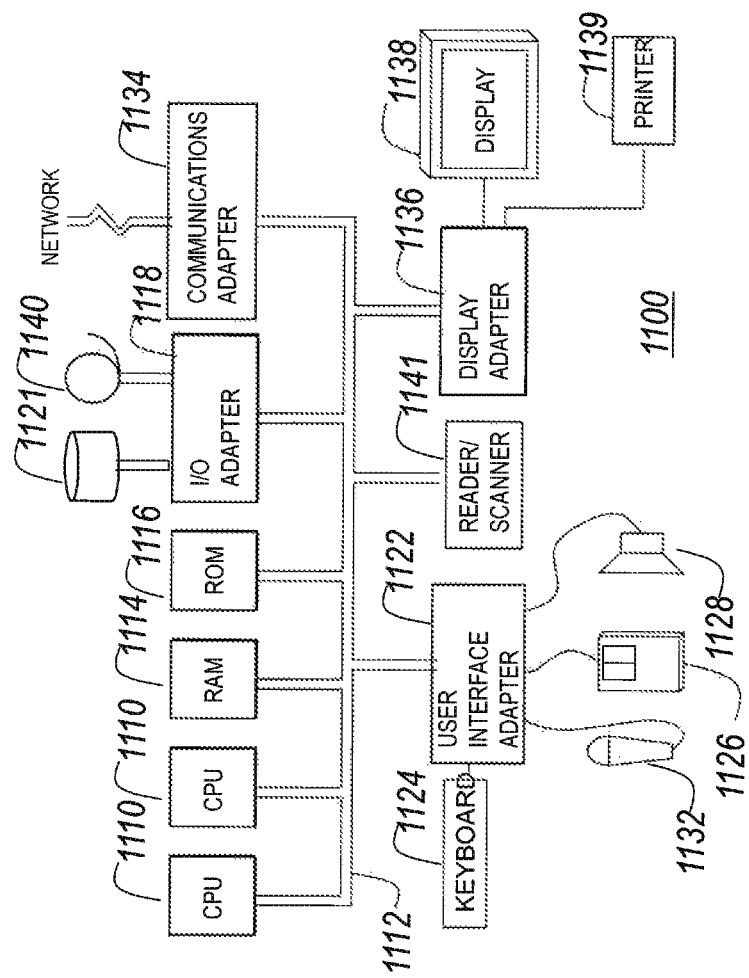
FIG. 27 illustrates an exemplary hardware/information handling system for incorporating the example embodiment of the present invention therein.

FIG. 27 illustrates another hardware configuration of the system, where there is an information handling/computer system 1100 in accordance with the present invention and which preferably has at least one processor or central processing unit (CPU) 1110 that can implement the techniques of the invention.

The CPUs 1110 are interconnected via a system bus 1112 to a random access memory (RAM) 1114, read-only memory (ROM) 1116, input/output (I/O) adapter 1118 (for connecting peripheral devices such as disk units 1121 and tape drives 1140 to the bus 1112), user interface adapter 1122 (for connecting a keyboard 1124, mouse 1126, speaker 1128, microphone 1132, and/or other user interface device to the bus 1112), a communication adapter 1134 for connecting an information handling system to a data processing network, the Internet, an Intranet, a personal area network (PAN), etc., and a display adapter 1136 for connecting the bus 1112 to a display device 1138 and/or printer 1139 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, including signal-bearing storage media tangibly embodying a program of machine-readable instructions executable by a digital data processor incorporating the CPU 1110 and hardware above, to perform the method of the invention.

This signal-bearing storage media may include, for example, a RAM contained within the CPU 1110, as represented by the fast-access storage for example.

Alternatively, the instructions may be contained in another signal-bearing storage media, such as a flash memory or optical storage diskette, directly or indirectly accessible by the CPU.

Whether contained in the flash memory, the optical disk, the computer/CPU, or elsewhere, the instructions may be stored on a variety of machine-readable data storage media.

Therefore, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 28:
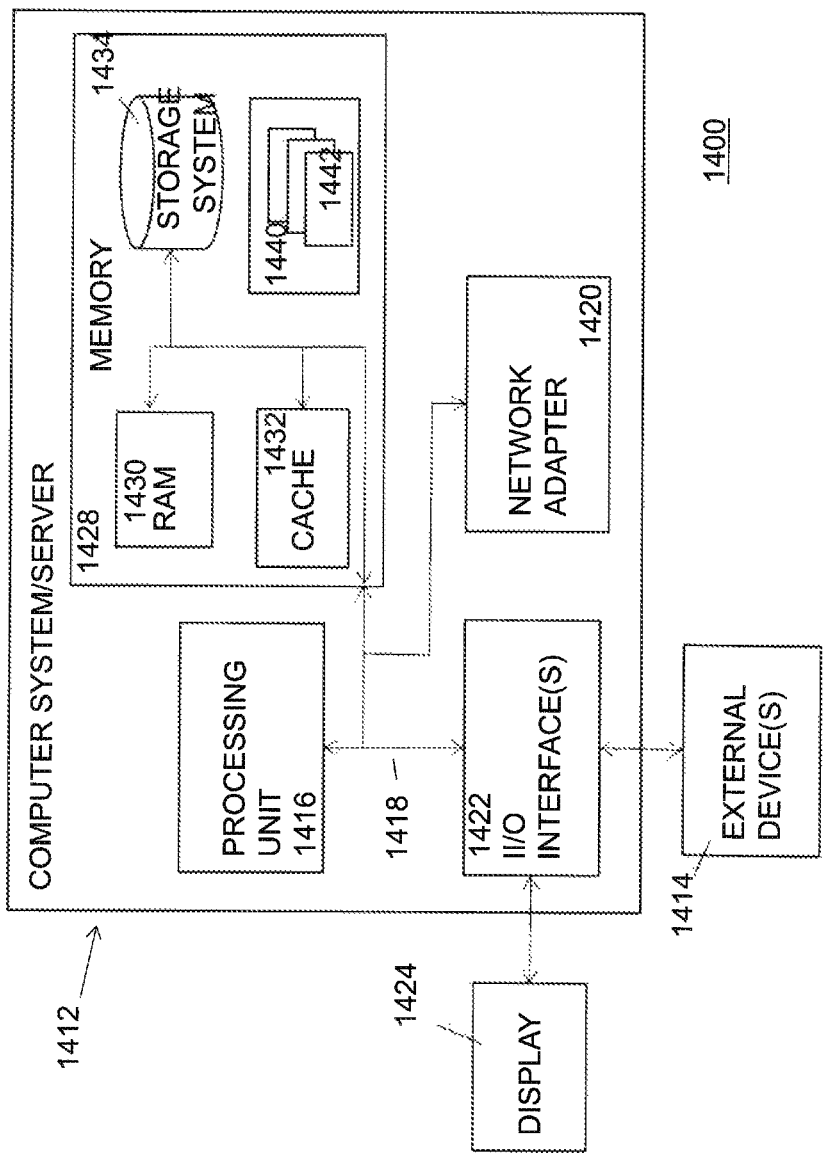
FIG. 28 depicts a cloud computing node according to an example embodiment of the present invention.

Referring now to FIG. 28, a schematic 1400 of an example of a cloud computing node is shown. Cloud computing node 1400 is only one example of a suitable cloud computing node and is not intended to suggest any limitation as to the scope of use or functionality of embodiments of the invention described herein. Regardless, cloud computing node 1400 is capable of being implemented and/or performing any of the functionality set forth hereinabove. System 2100 of FIG. 23 and System 2102 of FIG. 25 can be implemented in a cloud infrastructure such as FIG. 28. In cloud computing node 1400 there is a computer system/server 1412, which is operational with numerous other general purpose or special purpose computing system environments or configurations. Examples of well-known computing systems, environments, and/or configurations that may be suitable for use with computer system/server 1412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1412 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 1412 may be practiced in distributed cloud computing environments where tasks are performed by remote processing devices that are linked through a communications network. In a distributed cloud computing environment, program modules may be located in both local and remote computer system storage media including memory storage devices.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

What is claimed is:

1. A method of protecting a program from making out of bounds memory references, the method comprising:
  determining whether an instruction makes out of bound references where the instruction that loads data from or stores data to a buffer refers to addresses that are outside the bounds of the buffer; and responsive to the determining that the instruction refers to addresses that are partially out of bounds, changing an execution of the load or the store comprising modifying a length of data specified in the instruction buffer by mapping bound references accessed via a pointer register;

wherein the pointer register comprises at least two fields and an extra copy of an index value in an address is stored in the pointer register; and wherein the at least two fields comprises at least one field for the extra copy of the index value.

2. The method according to claim 1, further comprising: responsive to the determining that the instruction refers to addresses that are completely out-of-bounds, issuing no load or store command;

identifying which out of bounds references has to be repaired after execution; and repairing the identified out of bounds references from a stored version of the out of bounds references;

wherein the identifying which out of bounds references has to be repaired after execution uses a table and an index.

3. The method according to claim 2, wherein responsive to the determining that the instruction refers to addresses that are partially out of bounds, changing the execution of the load or the store comprising modifying at least one of the starting address specified in the instruction, the length of data specified in the instruction, and the value for an out of bounds reference to load or store data that is within the bounds of the buffer.

4. The method according to claim 1, further comprising logging the out of bounds references, wherein when a load is determined to be partially or completely out-of-bounds, data returned for an out-of-bounds portion of the load is a predetermined or arbitrary value;

wherein when it is determined that an index value in an address pointer and a separately stored index value are not the same, an exception is raised.

5. The method according to claim 1, further comprising creating an in-bounds mask from the load and store instructions to prevent out of bounds references;

wherein the in-bounds mask comprises a predetermined bit for in-bounds and a different predetermined bit for out of bounds.

6. The method according to claim 1, wherein an exception is used to log or store the out of bounds references.

7. The method according to claim 1, wherein the index value in an address is compared to the extra copy in determining whether an instruction makes an out-of-bounds reference.

8. The method of claim 1, wherein the determining includes comparing the value of a pointer to bounds information that is associated with the pointer;

wherein responsive to the determining that the instruction refers to addresses that are partially out of bounds, changing the execution of the load or the store including modifying at least one of the starting address specified in the instruction.

9. The method according claim 1, wherein changing the execution of the load or the store further comprises:

modifying the starting address specified in the instruction or a value for an out of bounds reference to load or store data that is within the bounds of the buffer.

10. A system for protecting a program from making out of bounds memory references, comprising:

a memory storing computer instructions; and a processor configured to execute the computer instructions to:

determine whether an instruction makes out of bound references where the instruction that loads data from or stores data to a buffer refers to addresses that are outside the bounds of the buffer; and responsive to the determining that the instruction refers to addresses that are partially out of bounds, change an execution of the load or the store comprising modifying a length of data specified in the instruction buffer by mapping bound references accessed via a pointer register;

wherein the pointer register comprises at least two fields and an extra copy of an index value in an address is stored in the pointer register; and wherein the at least two fields comprises at least one field for the extra copy of the index value.

11. The system according to claim 10, further comprising:

responsive to the determining that the instruction refers to addresses that are completely out-of-bounds, issuing no load or store command;

identify which out of bounds references has to be repaired after execution; and repairing the identified out of bounds references from a stored version of the out of bounds references; and wherein the identifying which out of bounds references has to be repaired after execution uses a table and an index.

12. The system according to claim 10, further comprising logging the out of bounds references, wherein when a load is determined to be partially or completely out-of-bounds, data returned for an out-of-bounds portion of the load is a predetermined or arbitrary value; and wherein when it is determined that an index value in an address pointer and a separately stored index value are not the same, an exception is raised.

13. The system according to claim 10, further comprising creating an in-bounds mask from the load and store instructions to prevent out of bounds references;

wherein responsive to the determining that the instruction refers to addresses that are partially out of bounds, changing the execution of the load or the store.

14. The system according to claim 10, wherein an exception is used to log and store the out of bounds references.

15. The system according to claim 10, wherein the determining includes comparing the value of a pointer to bounds information that is associated with the pointer.

16. The system according to claim 10, wherein responsive to the determining that the instruction refers to addresses that are partially out of bounds, changing the execution of the load or the store comprising modifying at least one of the starting address specified in the instruction, the length of data specified in the instruction, and the value for an out of bounds reference to load or store data that is within the bounds of the buffer.

17. The system according to claim 10, wherein program instructions to change the execution of the load or the store further comprise program instructions to:

modify the starting address specified in the instruction or a value for an out of bounds reference to load or store data that is within the bounds of the buffer.

18. A computer program product comprising a computer readable storage medium having program instructions embodied therewith, the program instructions readable and executable by a computer to cause the computer to perform a method for protecting a program from making out of bounds memory references, comprising:
- determining whether an instruction makes out of bound references where the instruction that loads data from or stores data to a buffer refers to addresses that are outside the bounds of the buffer; and
- responsive to the determining that the instruction refers to addresses that are partially out of bounds, changing an execution of the load or the store comprising modifying a length of data specified in the instruction by mapping bound references accessed via a pointer register;
- wherein the pointer register comprises at least two fields and an extra copy of an index value in an address is stored in the pointer register;
- wherein the at least two fields comprises at least one field for the extra copy of the index value; and
- wherein an exception is used to log or store the out of bounds references.

19. The computer program product according to claim 18, further comprising:
- responsive to the determining that the instruction refers to addresses that are completely out-of-bounds, issuing no load or store command;
- identifying which out of bounds references has to be repaired after execution; and
- repairing the identified out of bounds references from a stored version of the out of bounds references;
- wherein the identifying which out of bounds references has to be repaired after execution uses a table and an index.

20. The computer program product according to claim 18, further comprising logging the out of bounds references,
- wherein when a load is determined to be partially or completely out-of-bounds, data returned for an out-of-bounds portion of the load is a predetermined or arbitrary value.

21. The computer program product according to claim 18, further comprising creating an in-bounds mask from the load and store instructions to prevent out of bounds references.

22. The computer program product according to claim 18, wherein the determining whether an instruction makes out-of-bound references involves determining whether an index value in an address differs from the extra copy of the index value.

23. A method of protecting a program from making out of bounds memory references, the method comprising:
- establishing whether an instruction that loads data from or stores data to a buffer refers to addresses that are outside the bounds of the buffer; and
- responsive to determining that an instruction refers to addresses that are outside the bounds of a buffer, modifying the starting address specified in the instruction or the length of the data specified in the instruction, or both the starting address specified in the instruction and the length of the data specified in the instruction, such that the instruction loads or stores data that is within the bounds of the buffer by mapping bound references accessed via a pointer register;
- wherein the pointer register comprises at least two fields and an extra copy of an index value in an address is stored in the pointer register; and
- wherein the at least two fields comprises at least one field for the extra copy of the index value.

24. The method according to claim 23, further comprising:
- responsive to determining that an instruction refers to addresses that are outside the bounds of the buffer in an operation that loads data from the buffer, changing a value for the addresses that are outside the bounds of the buffer; and
- identifying which out of bounds references has to be repaired after execution;
- wherein the identifying which out of bounds references has to be repaired after execution uses a table and an index.

25. The method according to claim 23, wherein an exception is used to log and store the out of bounds references, and
- wherein an extra copy of an index value in an address is stored in a register,
- further comprising logging the out of bounds references, generating an in-bounds mask from the load and store instructions to prevent out of bounds references;
- responsive to determining that an instruction refers to addresses that are outside the bounds of the buffer, changing a least part of the addresses that are outside the bounds of the buffer; and
- wherein the establishing involves determining whether an index value in an address differs from the extra copy of the index value.

26. A system for securing applications which make out of bounds references, comprising:
- a memory storing computer instructions; and
- a processor configured to execute the computer instructions to:
  - identify references which are out of bounds for a program;
  - change an address, length or a value of partially out of bounds references for a load operation; and
  - change the address or length for the partially out of bounds references for a store operation by mapping bound references accessed via a pointer register;
- wherein the pointer register comprises at least two fields and an extra copy of an index value in an address is stored in the pointer register; and
- wherein the at least two fields comprises at least one field for the extra copy of the index value.

* * * * *